United States Patent [19]

Kawazoe et al.

[11] Patent Number: 5,781,317
[45] Date of Patent: Jul. 14, 1998

[54] METHOD OF PRODUCING HOLOGRAPHIC OPTICAL ELEMENT AND DEVICE THEREFOR

[75] Inventors: Naoyuki Kawazoe, Yokkaichi; Hiroshi Ando; Teiyuu Kimura, both of Nagoya; Satoshi Koike; Sadahisa Onimaru, both of Chiryu, all of Japan

[73] Assignees: Nippondenso Co., Ltd., Kariya; Nipon Soken Inc., Nishio, both of Japan

[21] Appl. No.: 306,487

[22] Filed: Sep. 14, 1994

[30] Foreign Application Priority Data

| Sep. 14, 1993 | [JP] | Japan | 5-252629 |
| Sep. 14, 1993 | [JP] | Japan | 5-252631 |
| Sep. 29, 1993 | [JP] | Japan | 5-268177 |
| Oct. 1, 1993 | [JP] | Japan | 5-246922 |
| Feb. 15, 1994 | [JP] | Japan | 6-018599 |
| Mar. 1, 1994 | [JP] | Japan | 6-031417 |

[51] Int. Cl.⁶ .................................. G03H 1/20
[52] U.S. Cl. .................. 359/12; 359/13; 359/35
[58] Field of Search .................. 359/12, 13, 14, 359/16, 28, 35

[56] References Cited

U.S. PATENT DOCUMENTS

| 3,647,289 | 3/1972 | Weber | 359/12 |
| 3,758,186 | 9/1973 | Brumm | 359/12 |
| 4,530,564 | 7/1985 | Close | 359/3 |
| 4,730,912 | 3/1988 | Loy et al. | 359/16 |
| 4,943,126 | 7/1990 | Lang et al. | 359/12 |
| 5,103,323 | 4/1992 | Magarinos et al. | 359/8 |

FOREIGN PATENT DOCUMENTS

| 59-3463 | 1/1984 | Japan |
| 3-273276 | 12/1991 | Japan |
| 4-110984 | 4/1992 | Japan |
| 4-329585 | 11/1992 | Japan |
| 5-35172 | 2/1993 | Japan |
| 5-35871 | 5/1993 | Japan |
| 5-203812 | 8/1993 | Japan |

*Primary Examiner*—Jon W. Henry
*Assistant Examiner*—Darren E. Schuberg
*Attorney, Agent, or Firm*—Cushman Darby Cushamn IP Group of Pillsbury Madison & Sutro LLP

[57] ABSTRACT

A method of producing a holographic optical element which is capable of imparting complex corrections to the holographic optical element and of effecting the exposure using a short optical path permitting little disturbance to be infiltrated. A correction holographic optical element 13 for correcting the characteristics of the holographic optical element is disposed in at least one of the optical paths of an object beam 35 and a reference beam 36 that fall on a photosensitive material 11. The object beam 35 may be one obtained by reflecting the reference beam 36 by a reflection-type holographic optical element such as a reflection-type master holographic optical element 12. In the case of a holographic optical element used for the head-up display, the correction holographic optical element 13 may be given characteristics for correcting the curvature of the windshield or characteristics for correcting color aberration.

39 Claims, 45 Drawing Sheets a : SMALL

METHOD OF PRODUCING HOLOGRAPHIC OPTICAL ELEMENT AND DEVICE THEREFOR

BACKGROUND OF THE INVENTION

1. Field of the Invention

The present invention relates to a method of producing a holographic optical element in which complex corrections can be easily inserted.

2. Description of Related Art

A display image regenerated from a holographic optical element usually contains distortions and obscurity caused by, for example, color aberration and spherical aberration.

In a head-up display 9 for vehicles using the holographic optical element shown in FIG. 3, for example, the image is distorted due to the curvature of a windshield 91 in addition to the distortion caused by color and spherical aberrations.

That is, in the head-up display 9 (FIG. 3), a beam 30 emitted from a display unit 90 and bearing an image 93 to be displayed, is diffracted by a holographic optical element 94 so that the image is enlarged, and the regenerated beam 31 is reflected by a reflector film 911 which is disposed on a windshield 91, and the reflected beam 311 is observed. Here, the image is subject to distortion by the curvature of the windshield 91.

In order to cope with these problems, it can be contrived to impart diffraction characteristics to the holographic optical element 94 in order to correct for the curvature of the windshield 91. This further makes it possible to correct for color aberrations contained in the holographic optical element 94 and to correct for spherical aberrations in a magnifying mirror recorded in the holographic optical element.

As shown in FIG. 4, the above-mentioned correction has generally been imparted to the holographic optical element by inserting correction lenses 961 and 962 in the optical paths of an object beam 35 and a reference beam 36 that are incident on the photosensitive material 95 that is used to produce the holographic optical element.

As the correction lenses, nonspherical or asymmetrical lenses such as cylindrical lenses are used. However, the method of correcting the holographic optical element by using lenses involves the following problems.

A first problem is that correction by the use of lenses requires a complex correction operation. That is, the optical characteristics of a lens are determined by its physical properties. As the correction becomes more complex, therefore, it becomes more difficult to machine the lens and this imposes a limit on the accuracy thereof.

A second problem is related to the above-mentioned problem and is that as the correction becomes more complex, the more correction lenses must be used. That is, complex correction characteristics can no longer be obtained by a single lens and compound correction lenses must be used.

Therefore, the optical system becomes complex, can contain errors and becomes susceptible to disturbance (by vibration, dust and dirt, etc.).

A third problem is that the lens must have a thickness which is larger than a predetermined value and this imposes a limit on the shortness of the optical path and this permits much noise and disturbance to enter into the optical path. For instance, a medium (air or the like) in the optical path undergoes fluctuation due to temperature, and dirt and dust can easily enter into the optical path.

The above inconveniences increase as the correction becomes more complex and the number of lenses increases.

The present invention was accomplished in view of the above-mentioned problems inherent in the prior art, and provides a method of producing a holographic optical element with correction which is capable of easily imparting complex corrections to the holographic optical element and effecting the exposure to light using a short optical path which permits little disturbance to enter.

SUMMARY OF THE INVENTION

The present invention is concerned with a method of producing a holographic optical element by projecting an object beam and a reference beam onto both surfaces of a photosensitive material, wherein a correction holographic optical element is disposed in at least one of the optical paths of the object beam and the reference beam to correct diffraction characteristics of the holographic optical element.

In the present invention, the greatest attention should be given to the fact that the holographic optical element is exposed to light while a correction holographic optical element is disposed in the optical path of either the object beam or the reference beam or in both of these optical paths. That is, in the present invention, a correction holographic optical element is used instead of the conventional correction lens.

The correction holographic optical element can be either a transmission-type holographic optical element or a reflection-type holographic optical element.

A pair of light beams constituting the object beam and the reference beam projected onto the photosensitive material may be two separate light beams (two-beam method) or a pair of light beams (one-beam method) consisting of a directly irradiated beam of a single beam and a beam that has passed through the photosensitive material may be one single beam.

According to the above one-beam method, the reference beam is permitted to be incident on a first surface of the photosensitive material, and the reference beam light that has passed through the photosensitive material is reflected by a reflection-type optical element and is permitted to be incident, as the object beam, on a second surface of the photosensitive material.

In the case of the one-beam method, it is desired that the correction holographic optical element is disposed between the reflection-type holographic optical element and the photosensitive material. Thus, the photosensitive material, correction holographic optical element and reflection-type holographic optical element can be arranged in a state in which they are intimately adhered to one another or are disposed very close to one another. Accordingly, very little disturbance or noise enters into the optical path between the above-mentioned three members, and the holographic optical element can be exposed to light in an optically stable state.

When the correction holographic optical element is imparted with optical characteristics for correcting the distortion of image caused by the curvature of the windshield of the head-up display, a holographic optical element for a head-up display forms an image without distortion.

When the correction holographic optical element is further imparted with optical characteristics for correcting color aberration that occurs on the head-up display, an image which is hardly obscured by color aberration or the like can be obtained.

Both the curvature of the windshield and the color aberration are corrected using a single holographic optical element without causing the optical path to be extended and without causing the optical system to become complex.

In the method of producing a holographic optical element according to the present invention, holographic optical elements can be corrected by using a correction holographic optical element.

The correction holographic optical element makes it possible to easily obtain a variety of complex diffraction characteristics by changing the combination of wave fronts of the pair of light beams that are projected at the time of exposure or by using multiple exposure beams.

Interference fringes having suitable characteristics can be formed on a single thin planar photosensitive material without permitting its physical size to increase. Moreover, the thickness is much smaller than that of a lens.

Accordingly, very small limitation is imposed on the optical system for exposing the holographic optical element, and the degree of freedom for its constitution is markedly improved.

The optical path of the object beam or the reference beam is shortened thus permitting little disturbance or noise to enter.

For instance, by intimately adhering the correction holographic optical element to the photosensitive material, no disturbance and foreign matter are allowed to enter between them, and a stable and homogeneous holographic optical element is produced.

Even when the correction holographic optical elements have different characteristics, their shapes and sizes can be the same. By using the same optical system (apparatus), therefore, the holographic optical elements having different characteristics can be easily produced by changing the correction holographic optical element.

According to the present invention as described above, a method of producing a holographic optical element with correction is provided which is capable of easily imparting complex corrections to the holographic optical element and effecting the exposure to light with a short optical path thus permitting little disturbance to enter.

DESCRIPTION OF THE PREFERRED EMBODIMENTS

Figure 1:
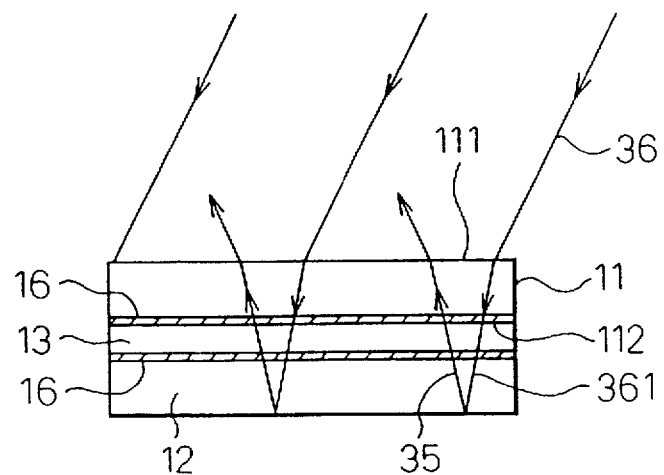
FIG. 1 is a diagram of arrangement illustrating a method of producing a holographic optical element according to a first embodiment of the present invention.

FIG. 1 is a diagram illustrating the arrangement of a method of producing a holographic optical element according to a first embodiment of the present invention. The method of producing the holographic optical element according to the first embodiment of the present invention will now be described with reference to FIG. 1. This embodiment deals, as shown in FIG. 1, with a method of producing a holographic optical element by projecting an object beam 35 and a reference beam 36 onto both surfaces of the photosensitive material 11 used to produce the holographic optical element.

In the optical path of the object beam 35 is disposed a correction holographic optical element 13 for correcting the diffraction characteristics of the holographic optical element.

The reference beam 36 is incident on a first surface 111 of the photosensitive material 11, and reference beam 361 that has passed through the photosensitive material 11 is reflected by a master holographic optical element 12 that serves as a reflection-type optical element. The reflected beam is then permitted to be incident as the object beam 35 on a second surface 112 of the photosensitive material 11. The correction holographic optical element 13 is disposed between the second surface 112 of the photosensitive material 11 and the master holographic optical element 12.

Figure 3:
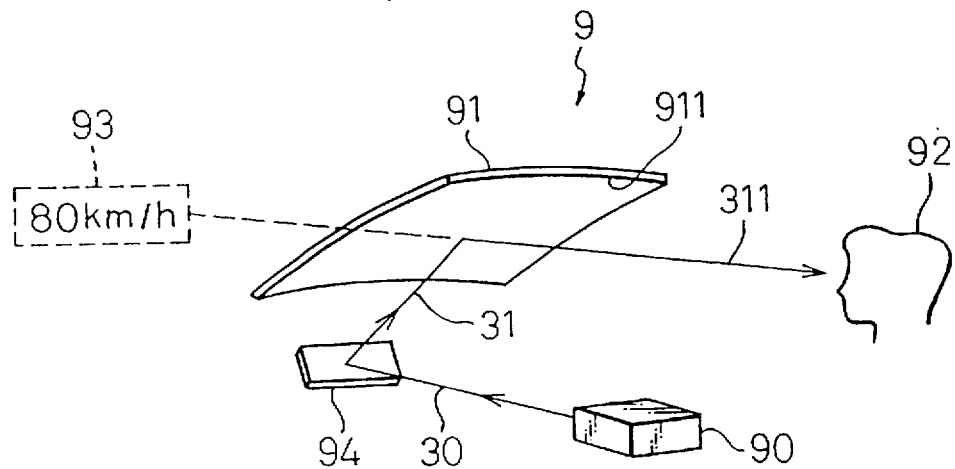
FIG. 3 is a diagram illustrating the constitution of a head-up display.
Figure 4:
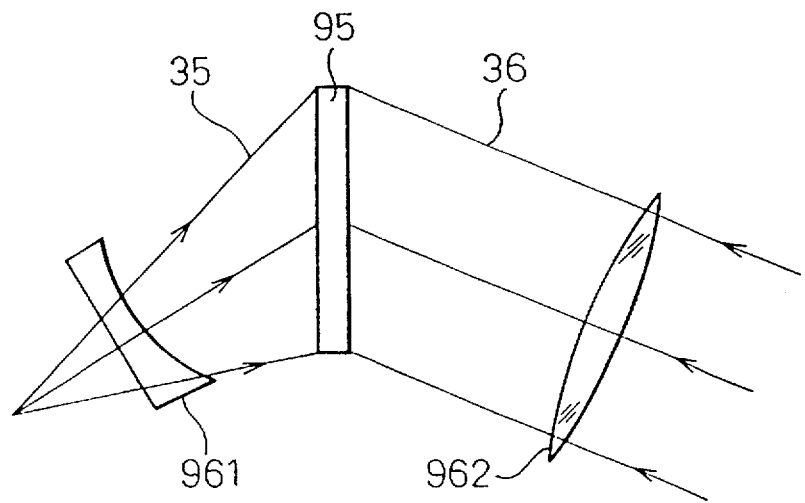
FIG. 4 is a diagram illustrating the optical constitution of the method of producing a conventional holographic optical element with correction.

The correction holographic optical element 13 imparts diffraction characteristics to the holographic optical element that is used for the head-up display shown in FIG. 3 to correct for the curvature of the windshield and for color aberrations.

As shown in FIG. 1, the photosensitive material 11, correction holographic optical element 13 and master holographic optical element 12 are disposed intimately adhered to each other, as required, using a solution 16 for adjusting refractive index or the like.

The master holographic optical element 12 imparts to the holographic optical element the diffraction/reflection characteristics (magnifying glass characteristics) for magnifying and reflecting the image that are necessary for the head-up display. In addition to the magnifying glass characteristics, the correction holographic optical element imparts characteristics for correcting color aberrations and for correcting the distortions caused by the windshield. The photosensitive material of the holographic optical elements 11 to 13 may be a gelatine dichromate, a silver salt, a photo polymer or the like.

Described below are the actions and effects of the method of producing the holographic optical element according to this embodiment.

The correction holographic optical element 13 is about 20 μm thick which is very thin compared to a conventional simple correction lens which has a thickness of about 1 mm or more. Moreover, the correction holographic optical element 13 has a flat shape and can be very easily disposed in a space in an optical system.

Accordingly, an optical system for exposure can be constituted in an intimately adhered manner in a very narrow space as shown in FIG. 1.

Furthermore, with the photosensitive material 11, correction holographic optical element 13 and master holographic optical element 12 being intimately adhered together, neither foreign matter nor optical noise can enter into the optical path, and the holographic optical element can be produced under stable conditions.

It is therefore possible to mass-produce holographic optical elements which are homogeneous and are of good quality.

It is further possible to impart complex optical characteristics to a thin correction holographic optical element, making it possible to effect complex corrections in a small space.

Though the characteristics may be different, the master holographic optical element 12 and the correction holographic optical element 13 can be set to have the same shape and size. By replacing the holographic optical elements 12 and 13, therefore, a variety of holographic optical elements using the same device as that of FIG. 1 can be produced.

According to this embodiment as described above, complex corrections to the holographic optical elements can be easily accomplished using a short optical path for exposure and, besides, a holographic optical element with a homogeneous correction quality can be produced.

It is possible to use a lens for obtaining a copy instead of the master holographic optical element 12.

Figure 2:
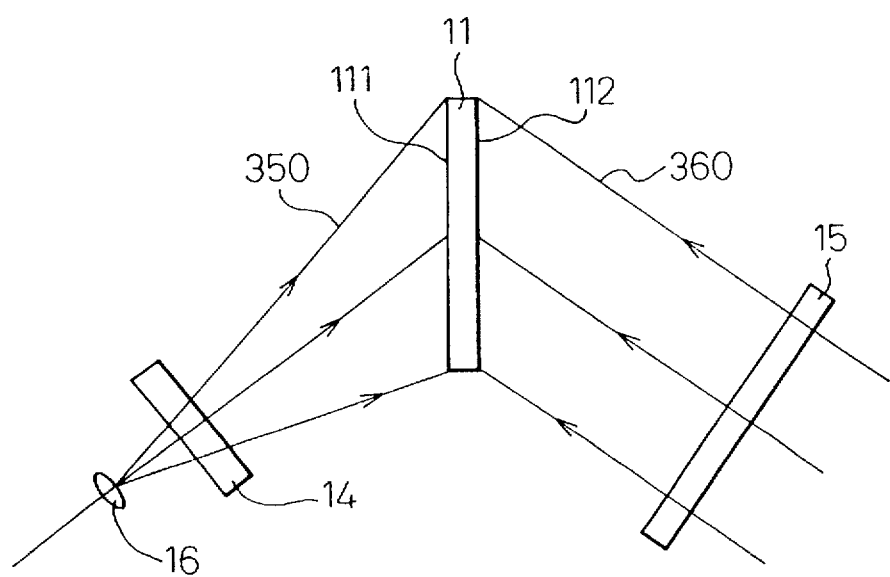
FIG. 2 is a diagram illustrating the optical constitution of the method of producing a holographic optical element.

FIG. 2 is a diagram illustrating the method of producing a holographic optical element with correction by a two-beam method.

A first surface 111 of the photosensitive material 11 is irradiated with the object beam 350 diverged through a diverging lens 16, and a second surface 112 thereof is irradiated with the reference beam 360 which is the parallel light. In these optical paths are disposed correction holographic optical elements 14 and 15 of the transmission type.

A holographic optical element is formed on the photosensitive material 11 by the object beam 350 that has passed through the first correction holographic optical element 14 and by the reference beam 360 that has passed through the second correction holographic optical element 15.

This embodiment uses two light beams and, hence, the optical system becomes slightly more complex compared with that of the first embodiment but offers an increased degree of freedom in regard to the angle of irradiation. In other respects, this embodiment is the same as the first embodiment and gives the same effects.

The aforementioned embodiments make it possible to easily copy complex correction and optical characteristics but involve problems as described below.

Figure 17:
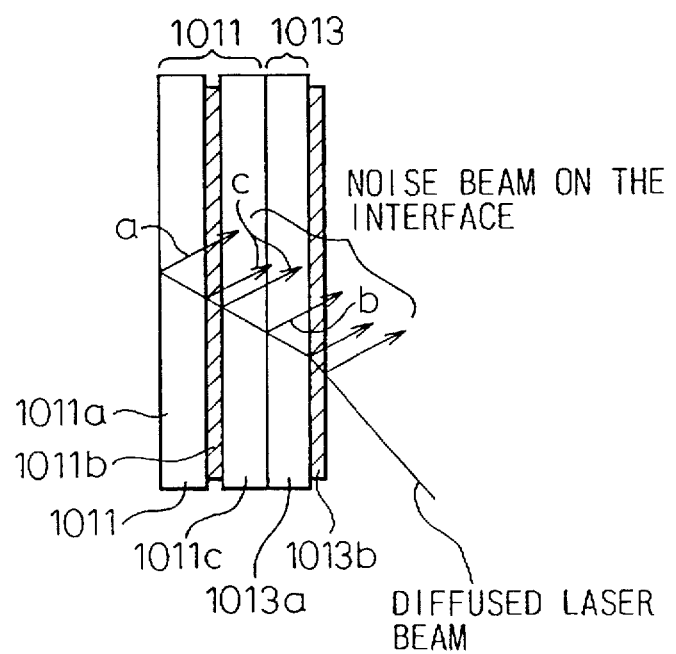
FIG. 17 is a diagram which illustrates FIG. 16 in detail.

Referring to FIG. 17, a conventional master holographic optical element 1011 comprises a base glass 1011a of a master, a holographic surface 1011b formed thereon, and a cover glass 1011c on the master for protection. A hologram recording film 1013 for copying the holographic image comprises a glass plate 1013a which is in contact with the cover glass 1011c on the master and a gelatin film 1013b on which the copy will be formed. When a laser beam is permitted to be incident on the front surface to obtain a copy, the beam is reflected by interfaces and surfaces in addition to being diffracted by the holographic optical element, and the reflections are a cause of ghost images. In the reflected light shown in FIG. 17, the beam reflected by the back surface can be suppressed by applying black paint on the back surface of the base glass 1011a. Furthermore, the beam b reflected by the interface relative to the air layer between the cover glass 1011c of the master and the base glass 1013a of the hologram recording film, can be suppressed by index matching using silicone oil having a refractive index that matches that of the glass. However, the holographic surface 1011b on which interference fringes are recorded is formed by a holographic photosensitive material such as gelatin, photo polymer or the like, and usually has a refractive index different from that of the cover glass 1011c of the master or the base glass 1013a of the hologram recording film. Adjustment of the refractive index at the surface 1011b is difficult making it difficult to cope with the beam c reflected by the interface between the holographic surface 1011b and the cover glass 1011c.

In view of the above-mentioned problem, therefore, the embodiment of the present invention is concerned with a method of producing a holographic optical element of the reflection type in which the master holographic optical element 1011 is copied onto the hologram recording film 1013 using a reflected/diffracted beam which prevents reflections from the interface between the holographic surface 1011b and the cover glass 1011c from falling on the hologram recording film 1013.

Figure 5:
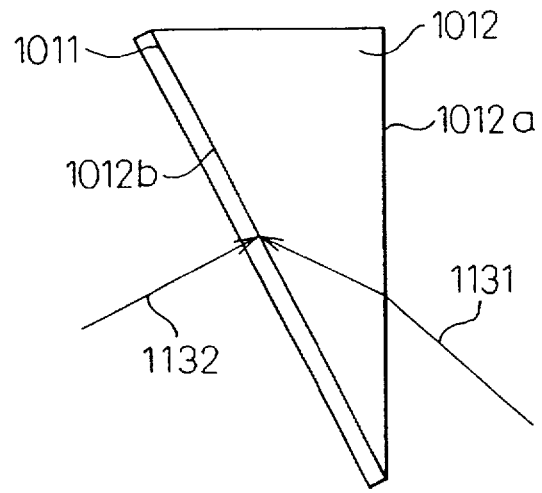
FIG. 5 is a diagram illustrating an optical system for recording a master holographic image in the method of producing a reflection-type holographic optical element according to a second embodiment of the present invention.

FIG. 5 is a diagram illustrating an optical system for recording the master holographic image by the method of producing the reflection-type holographic optical element according to a second embodiment of the present invention. As shown, a prism 1012 has a front surface 1012a and a back surface 1012b. A hologram recording film 1011 for recording the master holographic image is intimately adhered to the back surface 1012b of the prism 1012. Diffused laser beams 1131 and 1132 (recording beams) are incident on the front surface 1012a and on the back surface 1012b of the prism 1012, and a master holographic optical element 1011 containing the image of a master is formed.

Figure 6:
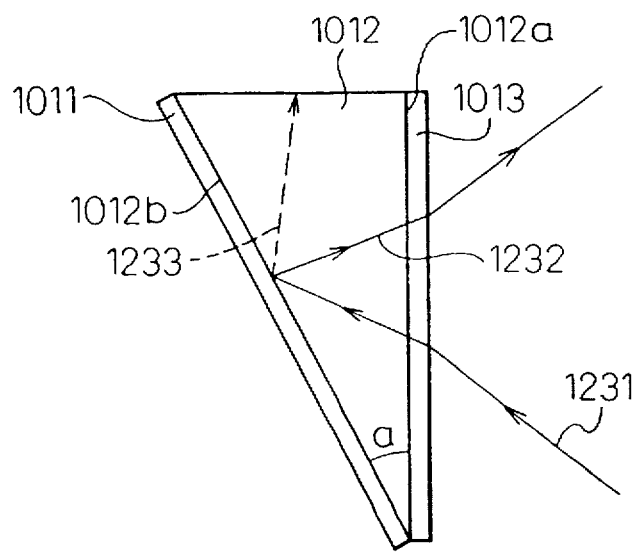
FIG. 6 is a diagram illustrating an optical system for producing a copy holographic optical element 1013 by using a master holographic optical element 1011 in the method of producing the reflection-type holographic optical element according to the second embodiment of the present invention.

FIG. 6 is a diagram illustrating an optical system for producing a copy holographic optical element 1013 by using the master holographic optical element 1011 in the method of producing the reflection-type holographic optical element according to the second embodiment of the present invention. In a system for producing the copy holographic optical element as shown, the master holographic optical element 1011 is intimately adhered to the back surface 1012b of a prism 1012 of the same shape as that of when the master holographic optical element is produced. Then, hologram recording films 1013 for copying the holographic image are intimately adhered to the front surface 1012a of the prism 1012 to make copies of the master holographic optical element 1011. A diffused laser beam 1231 (copying beam) is incident on the front surface of the hologram recording film 1013 for copying the holographic image. The diffused laser beam 1231 that has passed through the hologram recording film 1013 for copying the holographic image is diffracted by the master holographic optical element 1011, and the thus diffracted beam 1232 falls on the back surface of the hologram recording film 1013 for copying the holographic image. The diffracted beam 1232 incident on the back surface interferes with the diffused incident beam 1231 falling on the front surface, and the holographic optical element 1013 is formed. In this case, the light (reflected light) reflected by the interface between the surface of the master holographic optical element 1011 and the glass surface travels in a direction indicated by a dotted line 1233 and does not fall on the hologram recording film 1013. That is, the master holographic optical element 1011 is tilted with respect to the hologram recording film 1013, and the space therebetween is filled with the prism 1012 in order to change the direction of reflected light the light reflected by the interface between the surface of the master holographic optical element 1011 and the glass surface. This makes it possible to prevent the reflected light from falling on the hologram recording film 1013 and, hence, to copy the holographic image without it being affected by the reflected light, i.e., without forming ghosts. Mentioned below are further improvements to the embodiment.

First, the problems to be solved will be explained with reference to FIG. 6. The diffracted beam 1232 in FIG. 6 falls on the hologram recording film 1013 after having passed through the prism 1012. Therefore, a holographic image containing the aberrations of the prism 1012 is recorded on the hologram recording film 1013. When the prism 1012 has a large vertical angle α, therefore, the regenerated image is distorted. In the above-mentioned embodiment, the hologram recording film 1013 is tilted with respect to the master holographic optical element 1011, so that the reflected light will not fall on the hologram recording film 1013. When the direction for watching the normally generated image (image regenerated from the holographic optical element by the diffracted beam) is limited in generating the copied holographic optical element, however, reflected light may be permitted to fall on the hologram recording film 1013 provided the ghost image due to the reflected light is not seen by an observer. By taking this point into consideration, a means for solving the problem is described below.

Figure 7:
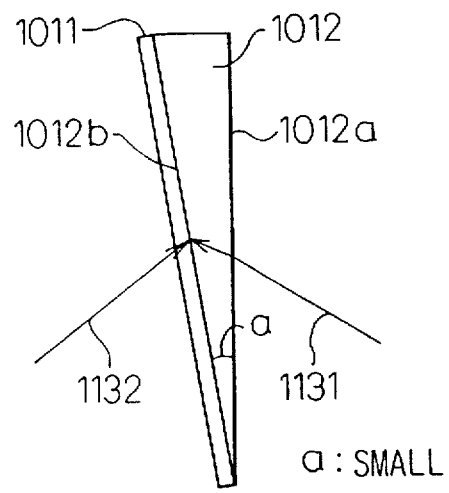
FIG. 7 is a diagram illustrating a first modification of the optical system for recording the master holographic image in the method of producing the reflection-type holographic optical element according to the second embodiment of the present invention.

FIG. 7 is a diagram illustrating a first modification of the optical system for recording the master holographic image by the method of producing the reflection-type holographic optical element according to the second embodiment of the present invention. In the optical recording system shown here, a hologram recording film 1011 for recording the master holographic optical element is intimately adhered to the back surface 1012b of the prism 1012 having a small vertical angle α, in order to record the master holographic image.

Figure 8:
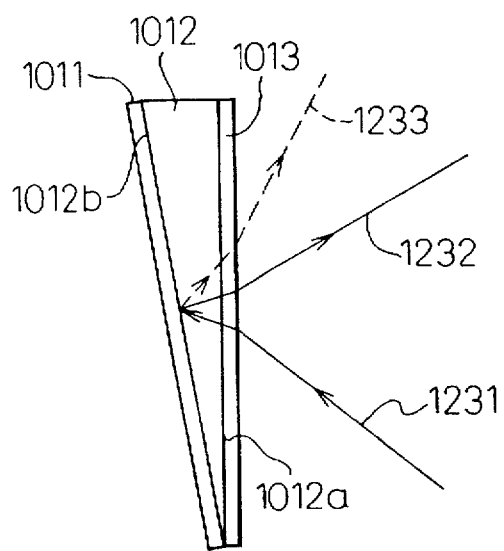
FIG. 8 is a diagram illustrating the first modification of the optical system for producing the copy holographic optical element 1013 by using the master holographic optical element 1011 in the method of producing the reflection-type holographic optical element according to the second embodiment of the present invention.

FIG. 8 is a diagram illustrating a first modification of the optical system for producing a copy holographic optical element 13 by using the master holographic optical element 1011 in the method of producing the reflection-type holographic optical element according to the second embodiment of the present invention. As shown, the master holographic optical element 1011 is intimately adhered to the back surface 1012b of the prism 1012 of the same shape to obtain a copy, and the hologram recording film 1013 is intimately adhered to the front surface 1012a thereof. In this state, the diffused laser beam 1231 is projected onto the front surface, so that the hologram recording film 1013 stores the holographic image. At this moment, reflected light 1233 reflected at the interface between the surface of the master holographic optical element 1011 and the glass surface falls on the hologram recording film 1013 thereby to form the holographic optical element thereon. Described below is the image regenerated by the reflected light.

Figure 9:
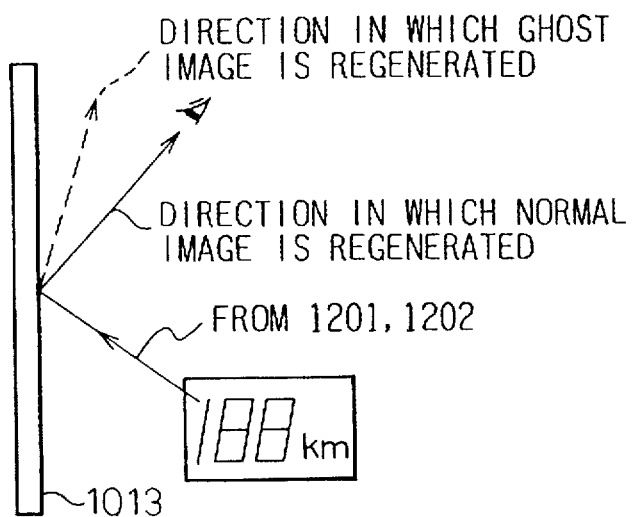
FIG. 9 is a diagram illustrating the regeneration of a ghost image formed by the copy holographic optical element 1013 of FIG. 8.

FIG. 9 is a diagram illustrating the regeneration of a ghost image from the copy holographic optical element 1013 of FIG. 8. As shown, the direction in which ghost image is regenerated by the reflected light is different from the direction in which the normal image is regenerated. Therefore, the ghost image that is regenerated cannot be seen from the position for observing the normally regenerated image.

Figure 10:
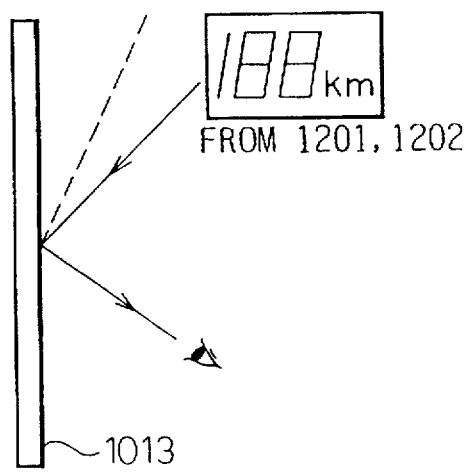
FIG. 10 is a diagram for preventing the regeneration of a ghost image by adjusting the arrangement of a display unit 1202 and a holographic optical element 1201.

FIG. 10 is a diagram of an example for preventing the regeneration of a ghost image by adjusting the arrangement of the holographic optical element 1201. Referring to FIG. 10, a display unit 1202 and a holographic optical element 1201 are disposed such that the diffracted beam travels opposite to that of FIG. 9. Then, the regenerated beam falls from a direction different from the direction of maximum efficiency incident to the copy holographic optical element 1013 of the reflected light. Accordingly, only a faint ghost image is regenerated. According to the method described above, the hologram recording film 13 is affected very little by the reflected light and the occurrence of aberration of the prism 1012 does not occur since the vertical angle α of the prism 1012 is small.

The above-mentioned method is not applicable to the cases where there is no limitation on the viewing direction or where the occurrence of even the slightest ghost image is not permitted. To cope with such cases, another method is described below.

Figure 11:
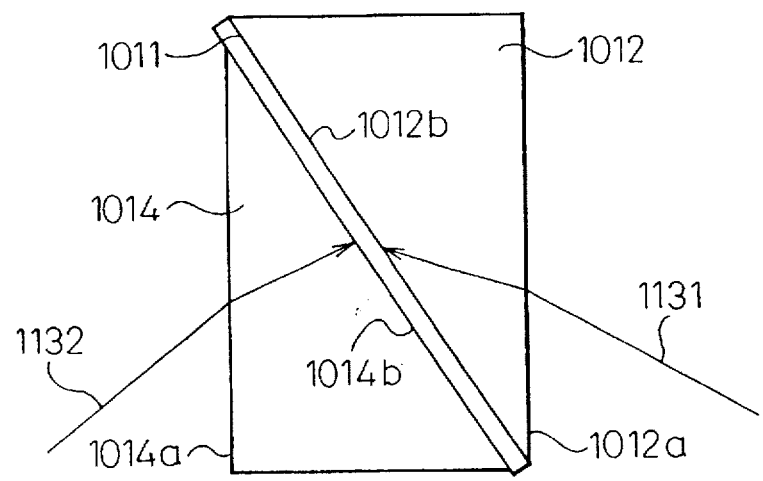
FIG. 11 is a diagram illustrating a second modification of the optical system for producing the copy holographic optical element 1013 by using the master holographic optical element 1011 in the method of producing the reflection-type holographic optical element according to the second embodiment of the present invention.
Figure 12:
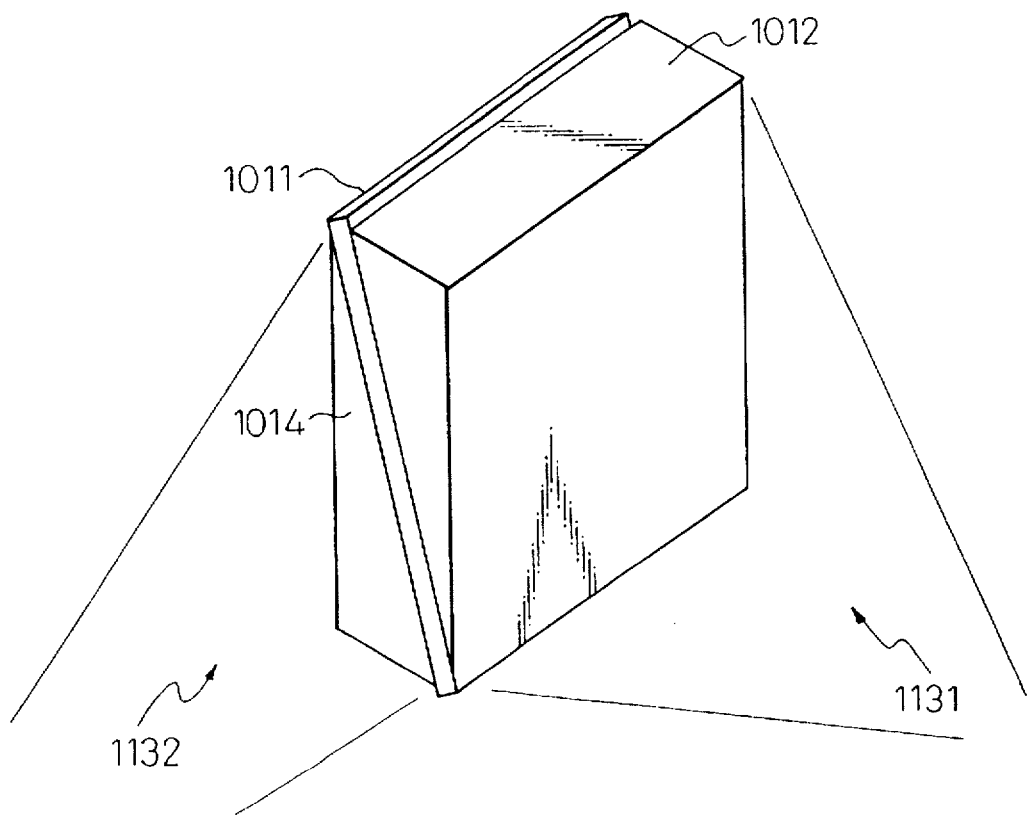
FIG. 12 is a solid diagram illustrating the optical system of FIG. 11.

FIG. 11 is a diagram illustrating a second modification to the optical system for recording the master holographic image according to the second embodiment of the present invention, and FIG. 12 is a solid diagram illustrating the optical system of FIG. 11. When the master holographic image is to be recorded as shown in FIGS. 11 and 12, the hologram recording film 1011 for recording the master holographic optical element is intimately adhered to the back surface 1012b of a first prism 1012. Moreover, the opposite side of the hologram recording film 1011 is intimately adhered to the back surface 1014b of a second prism 1014 having the same shape as that of the first prism 1012. Then, as shown in FIG. 11, diffused laser beams 1131 and 1132 are projected onto the front surfaces 1012a and 1014a of the first and second prisms 1012 and 1014 to record the master holographic image on the hologram recording film 1011.

Figure 13:
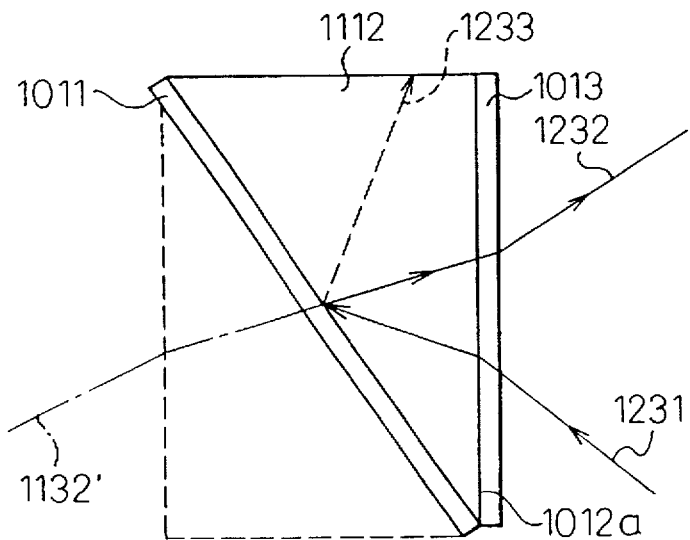
FIG. 13 is a diagram illustrating the second modification of the optical system for producing the copy holographic optical element 1013 by using the master holographic optical element 1011 in the method of producing the reflection-type holographic optical element according to the second embodiment of the present invention.
Figure 14:
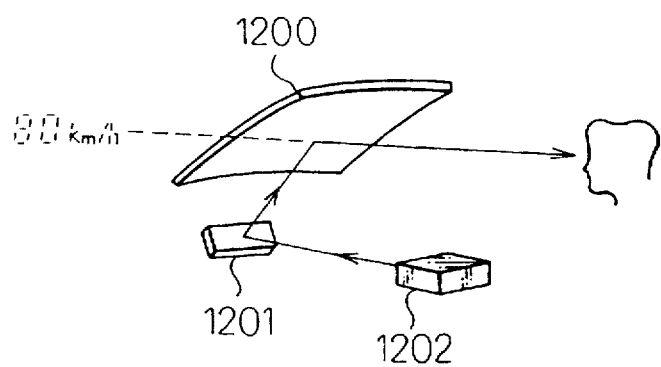
FIG. 14 is a diagram which schematically illustrates the head-up display.
Figure 15:
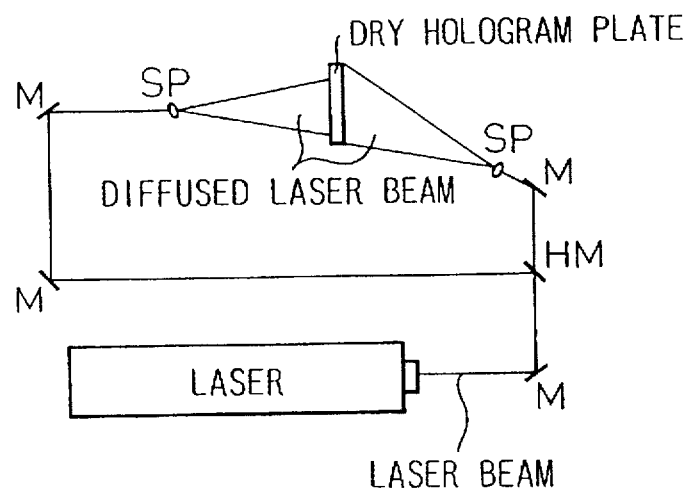
FIG. 15 is a diagram illustrating a two-beam method for producing a holographic optical element using a conventional reflection-type.
Figure 16:
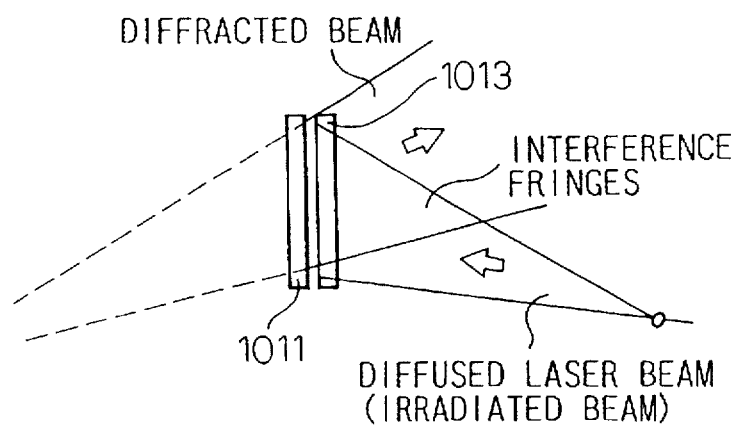
FIG. 16 is a diagram illustrating a method of copying the holographic image for producing a holographic optical element using the conventional reflection-type.

FIG. 13 illustrates the second modification to the optical system for producing the copy holographic optical element 1013 using the master holographic optical element 1011 in the method of producing the reflection-type holographic optical element according to the second embodiment of the present invention. To produce the copy holographic optical element 1013 as shown in FIG. 13, a hologram recording film 1013 for copying the holographic optical element is fitted onto the front surface 1012a of the first prism 1012 having the same shape as the master holographic image to be recorded on the hologram recording film 1011. Then, the master holographic optical element 1011 is fitted onto the back surface 1012b of the first prism 1012. A diffused laser beam for making a copy is projected onto the front surface of the hologram recording film 1013. The laser beam that has passed through the hologram recording film 1013 is then diffracted by the master holographic optical element 1011, falls on the back surface of the hologram recording film 1013 and the holographic image is recorded on the hologram recording film 1013. In obtaining the copy, the laser beam diffracted by the master holographic optical element 1011 passes through the first prism 1012 and then falls on the hologram recording film 1013. Here, the diffracted beam has been recorded on the master holographic optical element 1011 after having passed through the second prism 1014 at the time of recording the master and, hence, becomes equal to the light beam indicated by a dot-dash chain line 1132' in FIG. 13. Accordingly, the diffracted beam can be regarded as the beam that has passed through the second prism 1014 and the first prism 1012. On the other hand, the plane 1014a incident on the second prism 1014 at the time of recording the master holographic optical element becomes parallel to the surface 1012a incident on the hologram recording film 1013 at the time of obtaining the copy. Accordingly, the diffracted beam passes only through a flat plate sandwiched by the surface 1013a and the surface 1012a, and an aberration due to the prism hardly occurs. According to this method, almost no aberration occurs even when use is made of a prism having a large vertical angle α, and the reflected light can be removed without increasing aberration due to the prism. When the incidence of the reflected light is permitted, the effect of aberration can be further reduced by employing the aforementioned methods in combination.

According to the present invention as described above, the hologram recording film for copying the holographic image can be exposed without producing ghost images.

As described above, the present invention makes it possible to form the master holographic optical element with the prism intimately adhered to the hologram recording film for recording the master holographic image. By using the thus formed master holographic optical element to copy the holographic image with the prism interposed therebetween, it is possible to change the direction of the light that is reflected by the interface between the surface of the master holographic optical element and the glass surface. This makes it possible to prevent the reflected light from falling on the hologram recording film for copying the holographic image and to copy the holographic image without the copy being affected by reflected light, i.e., without forming a ghost image. Moreover, the aberration due to the prism can be decreased, the distortion of the image can be decreased, and the ghost image due to the reflected light can be removed without increasing the aberration due to the prism.

Figure 18A:
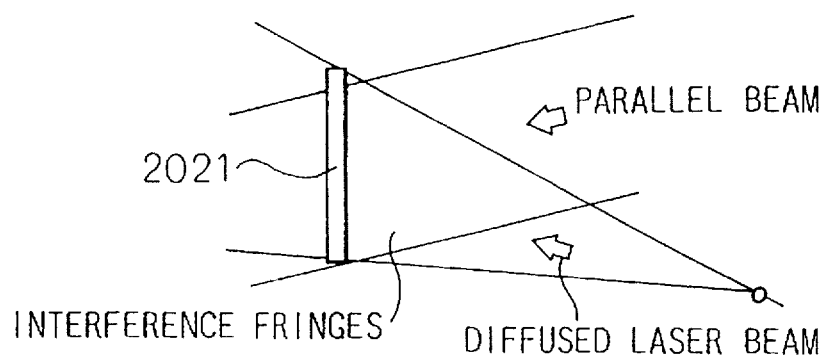
FIGS. 18(a) and 18(b) are diagrams illustrating constitutions for explaining the method of producing the holographic optical element using the reflection-type according to a third embodiment of the present invention.
Figure 18B:
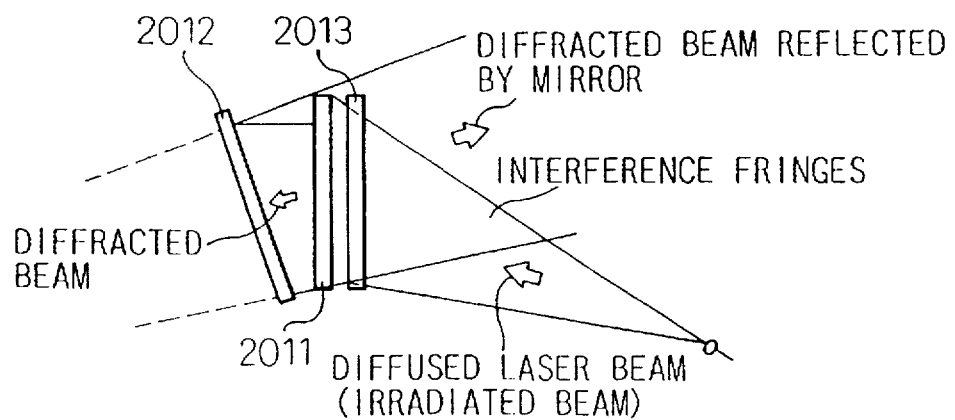
Figure 19:
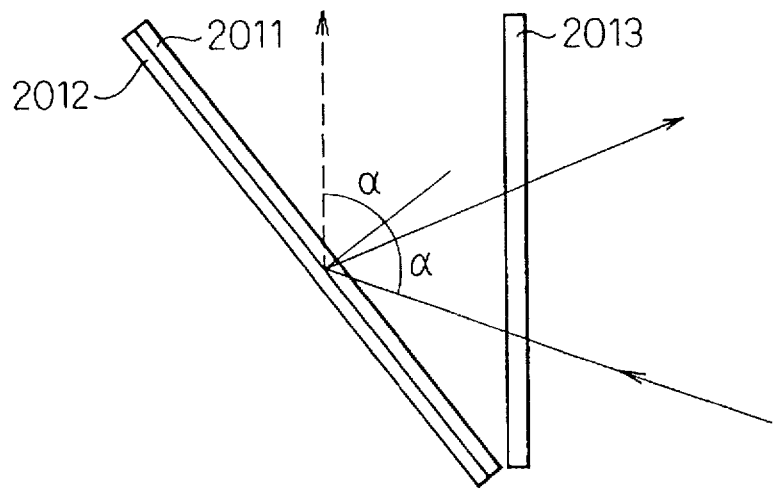
FIG. 19 is a diagram illustrating the constitution for explaining the method of producing the holographic optical element using the reflection-type according to the third embodiment of the present invention.

FIGS. 18(a) and 18(b) are diagrams of the constitution for explaining the method of controlling the holographic optical element using the reflection-type according to a third embodiment of the present invention. This embodiment uses, as the master holographic optical element, a transmission-type holographic optical element which has little wavelength selectivity and develops little irregularity in the diffracted beam even upon irradiation with a laser beam. Referring to FIG. 18(a), a transmission-type master holographic optical element 2011 is produced by recording the master holographic image on a hologram recording film 2021. By using the master holographic optical element 2011, the diffracted beam is reflected by the mirror 2012 to produce the reflection-type holographic optical element as shown in FIG. 18(b). The transmission-type holographic optical element 2011 has low wavelength selectivity and makes it possible to obtain a uniformly diffracted beam even upon irradiation with a laser beam. Accordingly, the reflection-type holographic optical element 2011 produced by the irradiated beam and the diffracted beam becomes homogeneous. As described above, this embodiment makes it possible to copy a homogeneous reflection-type holographic image that is difficult to obtain when a reflection-type holographic optical element is used as the master. As shown in FIG. 19, furthermore, the master holographic optical element 2011 and the mirror 2012 may be intimately adhered together. Details will be described below.

Figure 20:
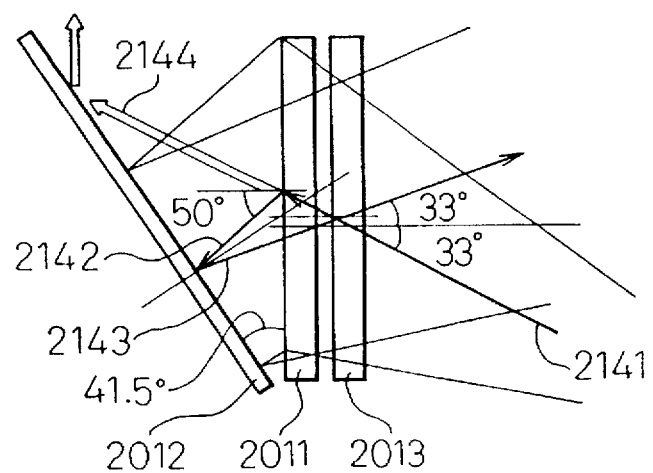
FIG. 20 is a diagram which illustrates the constitution of FIG. 18(b) in detail.

FIG. 20 is a diagram illustrating the constitution of FIG. 18(b) in detail. As shown, the apparatus for copying the holographic image comprises a transmission-type holographic optical element 2011 that serves as the master holographic optical element and a plane mirror 2012 for reflecting the diffracted beam, whereby the angle of diffraction of the master holographic optical element 2011 and the angle of arrangement of the mirror 2012 are determined depending upon conditions mentioned later. The apparatus for copying the holographic image further comprises a photosensitive plate 2013 that is placed in front of the master holographic optical element 2011 to copy the holographic image. When a laser beam (diffused beam in the drawing) 2041 is projected onto the master holographic optical element 2011 from the front surface of the photosensitive plate 2013, the beam passes through the photosensitive plate 2013 and is diffracted by the transmission-type holographic optical element 2011 to form a diffracted beam 2142 having predetermined optical characteristics. The diffracted beam 2142 is reflected by the plane mirror 2012 to form a reflected beam 2143. The reflected beam 2143 falls again on the master holographic optical element 2011. However, since the angle of the mirror 2012 has been so set that the angle of incidence is different from the direction of diffraction of the diffracted beam 2142, the master holographic optical element 2011 does not interfere with the beam and the reflected beam passes therethrough. The reflected beam 2143 that has passed through the master hologram falls on the back surface of the photosensitive plate 2013, and interference fringes between the irradiated beam 2141 and the reflected beam 2143 are recorded on the photosensitive plate 2013, and a reflection-type holographic optical element is formed having optical characteristics as set by the master holographic optical element 2011. Here, among the beams falling on the master holographic optical element 2011, the component that is not diffracted (referred to as a zero-order beam) 2144 is reflected by the plane mirror 2012 and falls on the photosensitive plate 21013. It can be considered that the incident beam turns into reflected light giving rise to the occurrence of an undesired ghost holographic image. This, however, can be solved by disposing the mirror 2012 at such an angle with respect to the photosensitive plate 2013 that the zero-order beam is not incident thereupon. Therefore, the angle of diffraction of the master holographic optical element 2011 of the mirror 2012 and the angle of arrangement of the plane mirror 2012 are set so as to satisfy the following three conditions.

(1) The diffracted beam 2143 reflected by the mirror 2012 is incident on the photosensitive plate 2013 at a predetermined angle (angle required for the reflection-type holographic copy).

(2) The diffracted beam 2143 reflected by the mirror 2012 is not diffracted by the master holographic optical element 2011 when it again falls on the master holographic optical element 2011.

(3) The zero-order beam reflected by the mirror 2012 does not fall on the photosensitive base plate 2013.

Described below are concrete examples of angles described in FIG. 20. In the master holographic optical element 2011 are stored interference fringes that diffract a laser beam incident at 33° to the perpendicular on the plane of the master holographic optical element 2011 to deflect to the direction of 50°. At the back of the master holographic optical element 2011, the plane mirror 2012 is tilted by 41.5° with respect to the surface of the master holographic optical element. A laser beam that is incident upon the master holographic optical element 2011 at 33° to the perpendicular is diffracted to deflect to the direction of 50°. The diffracted beam is reflected by the plane mirror 2012 and falls on the back surface of the master holographic optical element 2011 in a direction 33° to the perpendicular. This angle, however, is far way from the angle of deflection of 50°. Therefore, the beam passes through the master holographic optical element 2011 without being diffracted again. As a result, the photosensitive plate 2013 placed in parallel with the front surface of the master holographic optical element 2011 is irradiated with laser beams through both the front and back surfaces thereof from directions different at 33° to the perpendicular, and whereby a copy holographic optical element is formed in which are recorded interference fringes.

Figure 21:
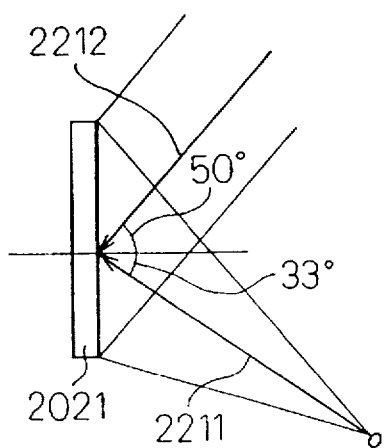
FIG. 21 is a diagram illustrating in detail an optical system for producing the master holographic optical element 2011 of FIG. 18(a)

FIG. 21 is a diagram illustrating in detail the optical system for producing the master holographic optical element 2011 of FIG. 18(a). As shown, a diffused beam 2211 and a parallel beam 2212 are permitted to be incident on the front surface of the photosensitive base plate 2021 at predetermined angles, whereby the master holographic image is recorded and is formed as designated at 2011.

Figure 22:
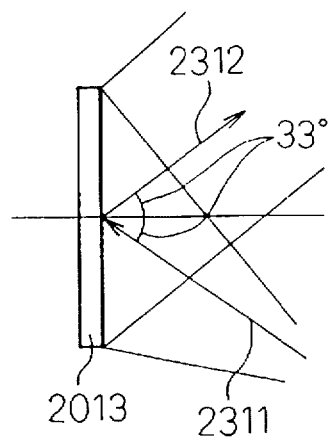
FIG. 22 is a diagram illustrating the use of the copy holographic optical element 2013.

FIG. 22 is a diagram explaining the use of a copy holographic optical element. As shown, the photosensitive plate 2013 becomes a copy holographic optical element. When the diffused beam 2311 is incident at 33° from the perpendicular, the parallel beam is diffracted at 33°. In this embodiment, the master holographic image is recorded using the diffused beam and the parallel beam, and the copy holographic optical element possesses optical characteristics of a parabolic reflector.

As for other modifications of the embodiment, the optical characteristics of the master holographic optical element are not limited to those mentioned earlier but, instead, an oval reflector may be established by causing diffused beams to interfere with each other. The mirror that reflects the diffracted light is not limited to a plane mirror. For instance, a convex reflector can be used to form a beam for recording a copy holographic image having predetermined optical characteristics in combination with the master holographic optical element. Improvements for the above-mentioned embodiment are described below.

Figure 23:
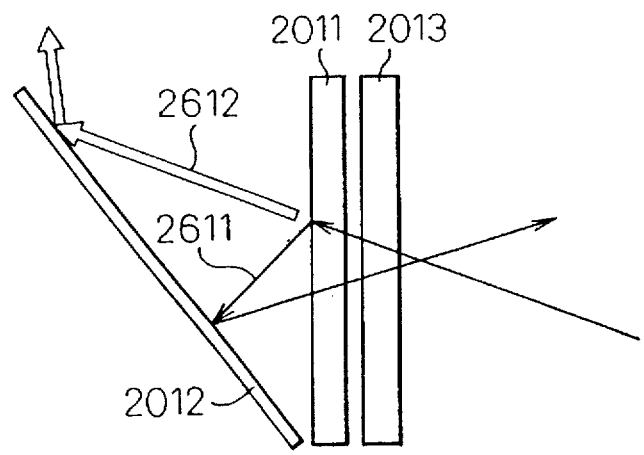
FIG. 23 is a diagram illustrating points to be improved in the third embodiment.

FIG. 23 is a diagram explaining points to be improved in the third embodiment. According to the above-mentioned method as shown in this diagram, a transmission-type holographic optical element is used as the master. Here, the transmission-type holographic optical element has little wavelength selectivity. By utilizing these characteristics, a master holographic optical element having complex optical characteristics such as a nonspherical shape can be copied without developing irregularity in the diffraction efficiency. A diffracted beam 2611 is produced when the master holographic optical element 2011 is irradiated with a laser beam. The diffracted beam is reflected by the mirror 2012, falls on the photosensitive plate 2013 that is placed in front of the master holographic optical element 2011, and forms a reflection-type holographic optical element by recording thereon interference fringes relative to the irradiated laser beam. The mirror 2012 is disposed obliquely with respect to the photosensitive base plate 2013, so that the beam (zero-order beam) 2612 that has passed through the master holographic optical element will not be reflected and fall on the photosensitive plate 2013. According to the above-mentioned copying method, which uses the transmission-type holographic optical element as a master holographic optical element, a space is formed between the photosensitive plate 2013 and the mirror 2012 since the mirror 2012 is obliquely arranged. In the case of the arrangement of FIG. 23, therefore, the beam is reflected by the back surface since an interface exists between the back surface of the master holographic optical element 2011 and the air. The reflected beam that is incident upon the photosensitive plate 2013 could become reflected light. Moreover, the air fluctuation in the space may deteriorate the quality of the copy holographic optical element. Mentioned below is means for solving this problem.

Figure 24:
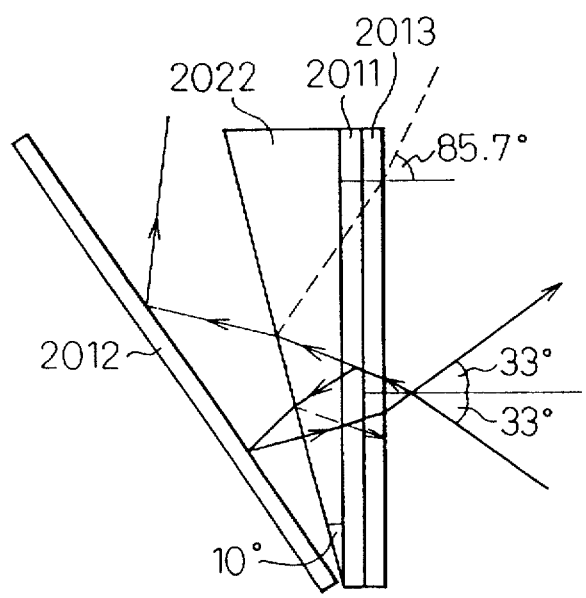
FIG. 24 is a diagram illustrating the constitution for explaining the method of producing the holographic optical element using the reflection-type according to another embodiment of the present invention.

FIG. 24 is a diagram of a constitution for explaining the method of producing an optical element by using the reflection-type holographic optical element according to another embodiment of the present invention. As shown, a prism 2022 having a small vertical angle (e.g., 10°) is provided on the back surface of the master holographic optical element 2011. By providing this prism 2022, the beam reflected by the back surface of the holographic optical element shown in FIG. 23 becomes the beam reflected by the surface of the prism 2022 as indicated by a dotted line in FIG. 24. Here, the vertical angle of the prism 2022 is set so that the reflected beam is incident in a direction different from the direction of incidence of the diffracted beam. Then, a holographic image recorded by the diffracted beam is formed at a position different from a position at which a holographic image recorded by reflected light is formed. In this embodiment as shown in FIG. 24, the directions are 33° and 85.7° with respect to the surface of the hologram recording film. When the holographic image is regenerated, therefore, a ghost image due to the holographic image recorded by reflected light is not seen from a normal position of observation, i.e., from a position of observing the holographic optical element formed by the diffracted beam. This makes it possible to remove the effect caused by reflected light. In this case, the vertical angle of the prism 2022 is so small that aberration by the prism 2022 is very small.

Figure 25:
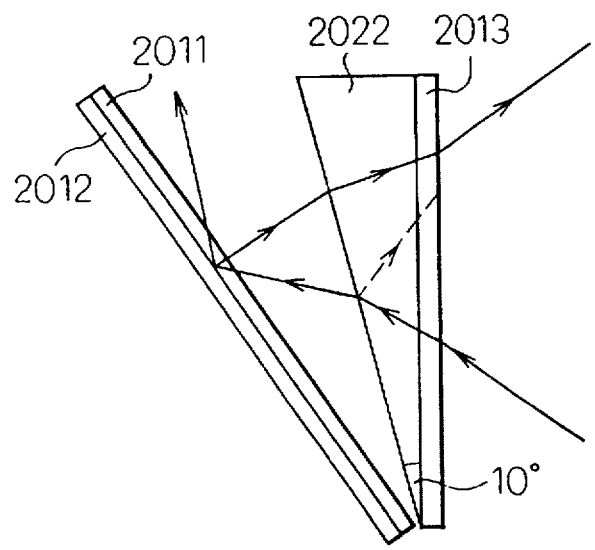
FIG. 25 is a diagram illustrating a first modification of another embodiment of FIG. 24.

FIG. 25 is a diagram illustrating a first modification of another embodiment of FIG. 24, and in which the prism 2022 is intimately adhered to the back surface of the hologram recording film 2013, and the master holographic optical element 11 is intimately adhered to the mirror 2012.

Figure 26:
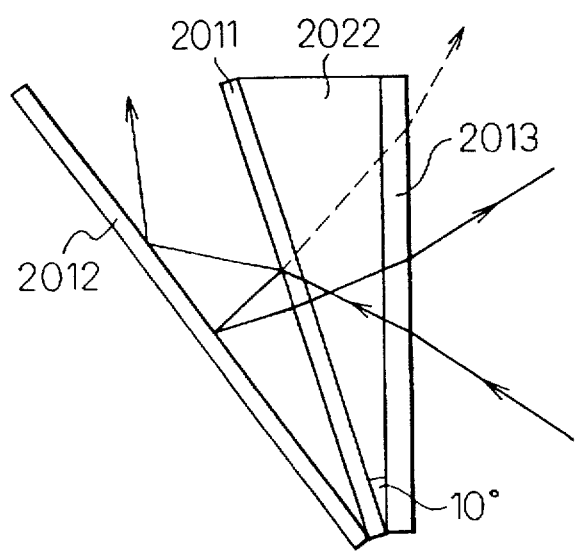
FIG. 26 is a diagram illustrating a second modification of another embodiment of FIG. 24.

FIG. 26 is a diagram illustrating a second modification of another embodiment of FIG. 24, and in which the hologram recording film 2013 is intimately adhered to the front surface of the prism 2022 and the master holographic optical element 2011 is intimately adhered to the back surface of the prism.

In the above-mentioned embodiment where space exists between the hologram recording film 2013 and the mirror 2012, the air fluctuation may deteriorate the quality of the copy holographic optical element. Mentioned below is a countermeasure against this problem.

Figure 27:
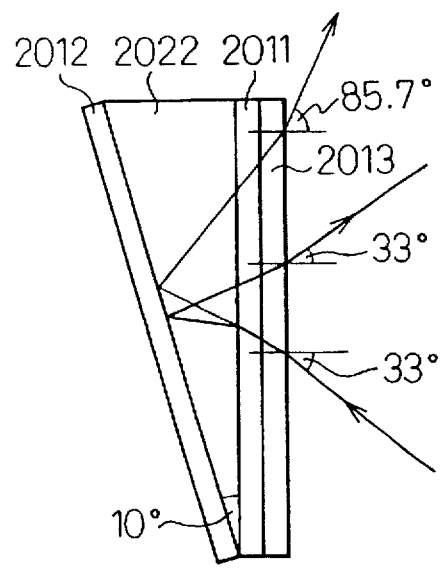
FIG. 27 is a diagram illustrating a third modification of another embodiment of FIG. 24.

FIG. 27 is a diagram illustrating a third modification of another embodiment of FIG. 24, in which the hologram recording film 2013 and the master holographic optical element 2011 are intimately adhered to the front surface of the prism 2022 having a small vertical angle (10°), and the mirror 2012 is intimately adhered to the front surface thereof. Since the vertical angle of the prism 2022 is small, aberration due to the prism 2022 is very small. On the other hand, the angle subtended by the hologram recording film 2013 and the mirror 2012 is so small that the zero-order beam falls on the hologram recording film 2011 and turns into reflected light. The angle of incidence, however, is different from the angle of incidence of the diffracted beam and should desirably be the angle of total reflection with respect to the surface of the hologram recording film 2013. The source of regenerating beam is placed in the direction of incidence of a laser beam at the time of obtaining a copy with respect to the thus copied holographic optical element, in order to regenerate the holographic image. According to the above method of regeneration, the holographic image recorded by the diffracted beam and the holographic image recorded by the reflected light have different directions of diffraction and are formed at different positions. In this embodiment, the directions are 33° and 85.7°. The effect caused by the reflected light like in the aforementioned case of FIG. 19 is therefore removed. Here, however, the zero-order beam is more intense than the beam reflected by the back surface and the holographic optical element formed by the reflected light is apparent to some extent, causing the brightness of the normally regenerated image to be decreased correspondingly.

Figure 28:
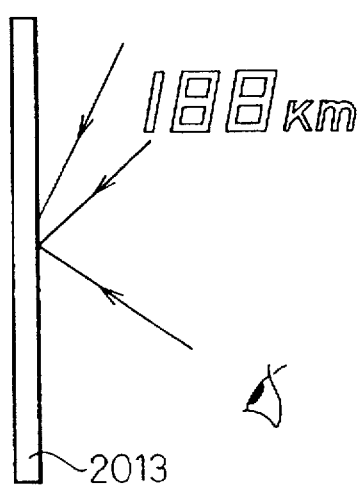
FIG. 28 is a diagram illustrating another regeneration method in which the source of regenerated light is disposed in a direction in which the diffracted beam travels.

FIG. 28 is a diagram illustrating another method of regeneration in which the source of the regenerating beam is disposed in the direction in which the diffracted beam travels. With the source of the regenerating beam (the display device in this embodiment) being disposed as shown, the holographic image recorded by the reflected light permits the incidence of the regenerating beam from a direction greatly deviated from the direction of incidence of a maximum efficiency as observed from the direction of incidence of a copying beam, and a ghost image is hardly formed.

Figure 29:
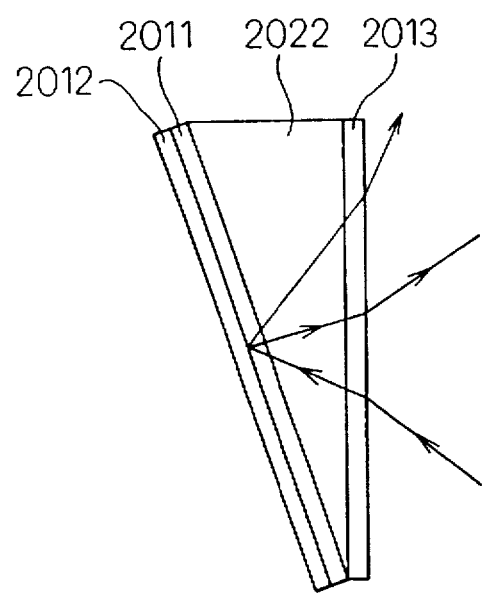
FIG. 29 is a diagram illustrating another example of the arrangement of FIG. 28.

FIG. 29 is a diagram illustrating another arrangement of FIG. 28, and in which the hologram recording film 2013 only is intimately adhered to the front surface of the prism 2022, and the master holographic optical element 2011 and the mirror 2012 are intimately adhered to the back surface thereof. This method makes it possible to remove the effect caused by the reflected light in the space formed between the hologram recording film 2013 and the mirror 2012 and by the air fluctuation in space. However, three laser beams fall on the hologram recording film 2013, i.e., the copying beam incident on the front surface, the diffracted beam and the zero-order beam incident on the back surface. Therefore, the light energy incident on the hologram recording film 2013 becomes so great that desired efficiency is often not obtained depending upon the kind of the photosensitive material forming hologram recording film 2013. The above-mentioned method cannot be adapted, either, when the regenerated image is observed from a wide range of angles or when the occurrence of even the slightest ghost image is not permitted. In such a case, therefore, there can be contrived a method of filling space of the optical system shown in FIGS. 18(a) and 18(b) with the prism 2022 having a triangular shape in cross section.

The foregoing description has dealt with the provision of a prism having a triangular shape in cross section in a spatial portion which, however, imposes a limitation on the angle of the prism from the standpoint of preventing the occurrence of aberration. The occurrence of aberration involves a problem in that the displayed image is distorted when the method is adapted to the head-up display. To escape from the limitation concerned the angle of the prism, it becomes necessary to prevent the generation of a reflected light without producing aberration by using an optical system which employs a prism at the time of producing the master holographic optical element to offset the aberration produced by the prism used at the time of obtaining a copy. Described below is how to prevent the generation of a reflected light.

Figure 30A:
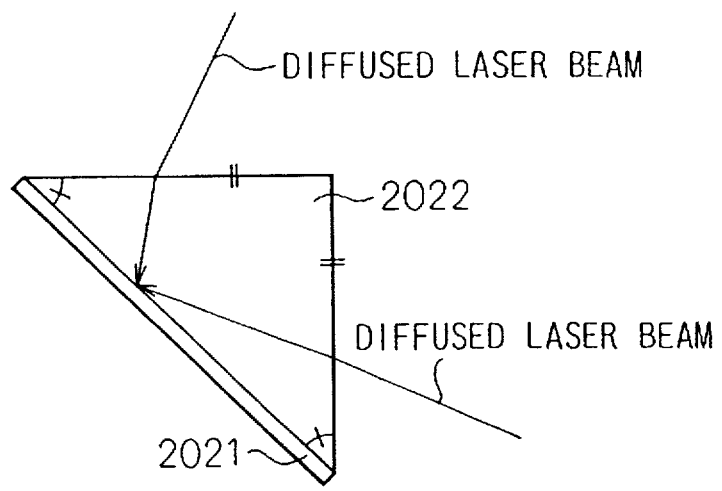
FIGS. 30(a) and 30(b) are diagrams illustrating the constitution for explaining the method of producing the holographic optical element using the reflection-type according to a further embodiment of the present invention.
Figure 30B:
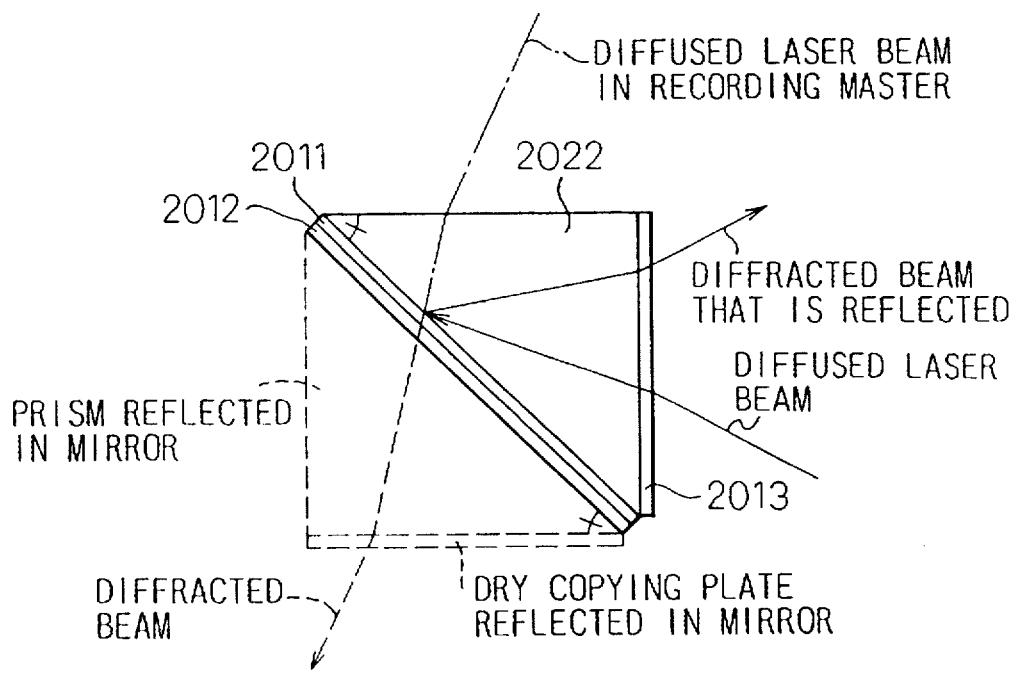

FIGS. 30(a) and 30(b) are diagrams of the constitution for explaining a method of producing the holographic, optical element using the reflection-type according to a further embodiment of the present invention. In order to solve the above-mentioned problems according to this embodiment as shown in FIG. 30(a), use is made of a prism 2022 having the shape of an isosceles triangle in cross section, so that the light reflected by the back surface is removed by the prism without causing aberration. The hologram recording film 2021 is set to the surface that is the base of the prism, and diffused laser beams are permitted to fall on the two equal sides to produce the transmission-type master holographic optical element 2011. To obtain a copy, a mirror 2012 is fitted to the back surface of the master holographic optical element 2011 as shown in FIG. 30(b). A hologram recording film 2013 for obtaining the copy is set onto one of the two equal sides, a diffused laser beam is projected constitute a holographic optical element relative to the diffracted beam of the master holographic optical element reflected by the mirror 2012. Here, if the path of the diffracted beam is followed, the plane of incidence of the prism at the time of recording the master is in parallel with the outgoing plane of the prism at the time of obtaining a copy with the mirror 2012 sandwiched therebetween. In this case, the diffracted beam simply undergoes a parallel translation, and almost no aberration is caused by the prism. This will be described hereinafter in detail.

Figure 31:
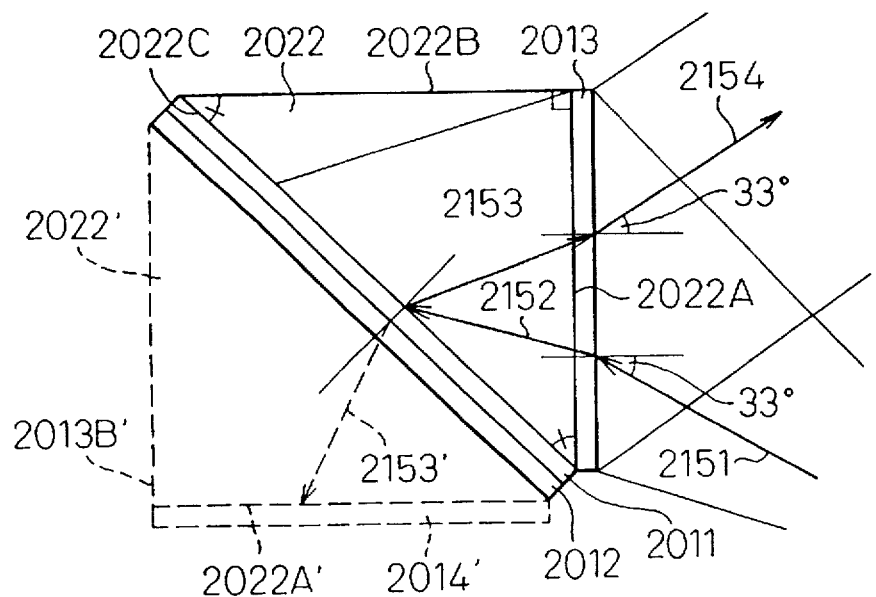
FIG. 31 is a diagram illustrating the constitution of FIG. 30(b) in detail.
Figure 32:
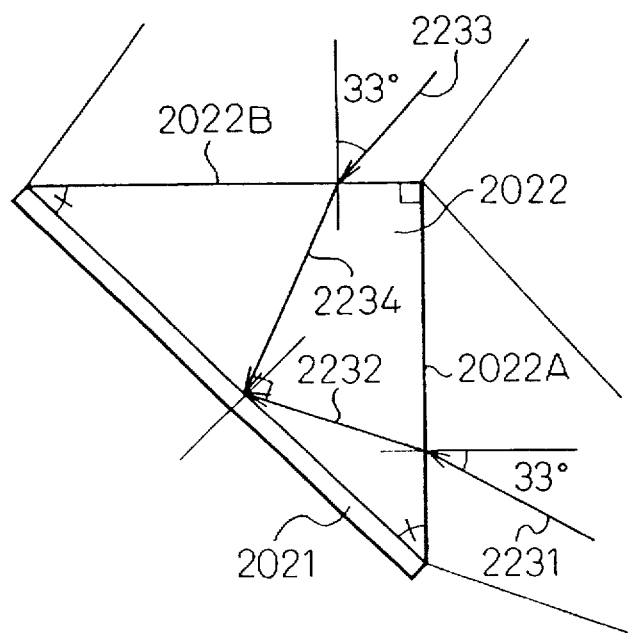
FIG. 32 is a diagram illustrating in detail the optical system for producing the master holographic optical element 2011 of FIG. 30(a)

FIG. 31 is a diagram which illustrates in detail the constitution of FIG. 30(b), and FIG. 32 is a diagram which illustrates an optical system for producing the master holographic optical element 2011 of FIG. 30(a). The apparatus for copying the holographic image shown in FIG. 31 comprises a prism 2022 having the shape of an isosceles triangle in cross section (a right-angled isosceles triangle in the drawing), the master holographic optical element 2011 and the plane mirror 2012. A photosensitive plate 2013 for obtaining a copy is mounted on one of the two equal sides of the prism 2022. In FIG. 32, a photosensitive plate 2021 that serves as a master holographic optical element 2011 is stuck to a surface 2022C that corresponds to the base of the prism 2022 having the same shape as that of FIG. 31. Concretely described below are the effects produced when the angles are as shown in FIGS. 31 and 32.

In FIG. 32, laser beams are incident on the two equal sides of the prism 2022 in the directions tilted by 33° with respect to the perpendiculars thereof. In this embodiment, a diffused beam 2231 falls on the prism surface 2022A and a parallel beam 2233 falls on the prism surface 2022B, the optical axes of the two light beams intersecting at right angles with each other. The laser beams passing through the prism interfere, and interference fringes are recorded on the photosensitive plate 2021 to form the master holographic optical element 2011. Referring next to FIG. 31, a plane mirror is mounted on the bottom surface 2022C of the prism 2022 having the same shape as the bottom surface of the prism 2022, and a laser beam 2151, the same as the beam 2231 emitted when the master is recorded, is projected onto the front surface of the photosensitive plate 2013 mounted on one side 2022A of the prism 2022. Then, the beam is diffracted by the master holographic optical element 2011 to produce a diffracted beam 2153' which is then reflected by the plane mirror 2012 to form a reflected beam 2153 that again passes through one side 2022A of the prism 2022 and falls on the photosensitive base plate 2013. The interference between the incident beam 2151 and the reflected beam 2153 is recorded on the photosensitive plate 2013. Attention is now given to an image 2022' of the prism 2022 reflected in the plane mirror 2012, the diffracted beam 2153' travelling therethrough and going out from one side 2022A' of the prism 2022'. The side 2022B which is the surface equal to the surface 2022B on which the parallel beam 2232 is incident at the time of recording the master holographic image, is in parallel with the side 2022A' (since the same angle is subtended by 2022A and 2022B with respect to 2022C). Therefore, the reflected beam 2154 apparently passes through two parallel surfaces 2022A and 2022B. Therefore, the beam is incident on the photosensitive plate 2013 for obtaining a copy almost without developing aberration due to the prism 2022, and the image is not distorted in the completed copy holographic optical element.

According to this embodiment as described above, the presence of the prism 2022 between the photosensitive base plate 2013 for obtaining the copy and the plane mirror 2012 eliminates adverse effects caused by a reflected light reflected by the interface and by the flickering of the air. Besides, the prism 2022 hardly develops any aberration, making it possible to form a high quality reflection-type holographic optical element.

Figure 33:
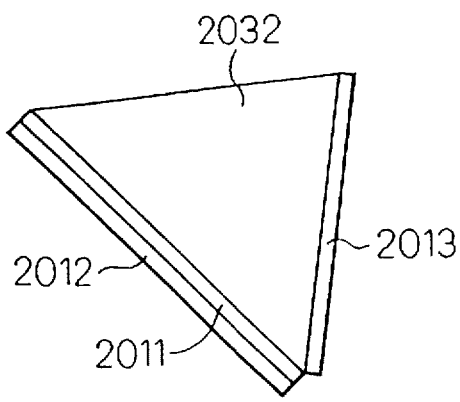
FIG. 33 is a diagram illustrating a first modification of FIG. 31.
Figure 34:
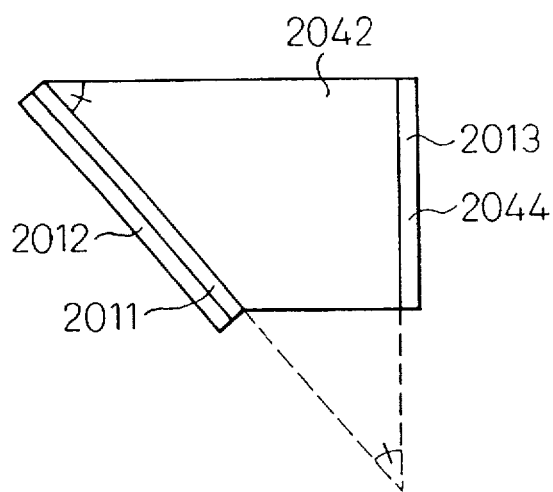
FIG. 34 is a diagram illustrating a second modification of FIG. 31.

FIGS. 33 and 34 are diagrams illustrating first and second modifications of FIG. 31. The sectional shape of the prism is not limited to the right-angled isosceles triangular shape shown in the embodiment. The angles subtended by the surfaces on which the two master hologram-recording beams are incident relative to the mirror should be the same. Therefore, the shapes shown in these drawings may be employed, wherein reference numerals 2032 and 2042 denote prisms.

Figure 35:
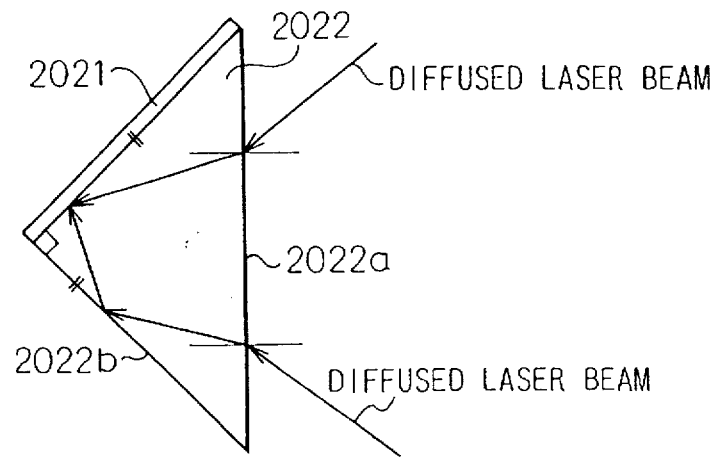
FIG. 35 is a diagram of the constitution for explaining the method of producing the optical element using the reflection-type holographic optical element according to a still further embodiment of the present invention.
Figure 36:
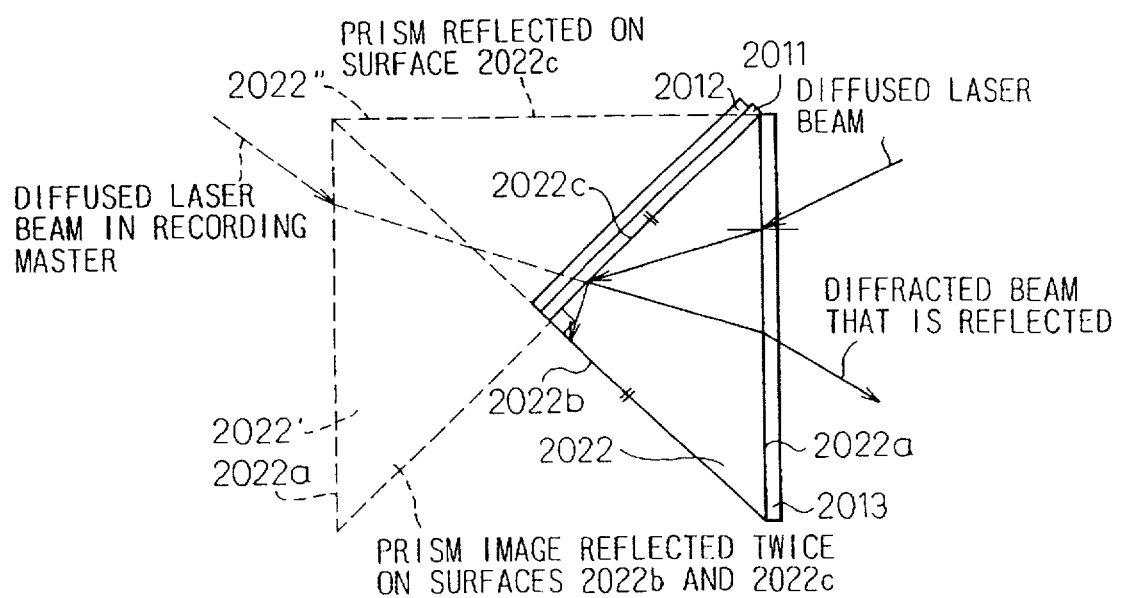
FIG. 36 is a diagram illustrating a modification of a still further embodiment of FIG. 35.

FIGS. 35 and 36 are diagrams of the constitution for explaining a method of producing a holographic optical element using the reflection-type according to a still further embodiment of the present invention. Use is made of a prism 2022 having a right-angle isosceles triangle shape in cross section as in the master-recording optical system shown in FIG. 35. The two diffused laser beams are incident on the base of the triangle which has the hologram recording film 2021 that serves as a master intimately adhered to one of the two equal sides to store the image. One diffused beam is directly incident upon the hologram recording film 2021. Another diffused beam is reflected once by a surface 2022b of the prism 2021 (by one of the two sides without having the hologram recording film 2021), and falls on the hologram recording film 2021 thereby to record the image.

FIG. 36 is a diagram illustrating an optical system for producing a reflection-type holographic optical element using the master holographic optical element produced in FIG. 25. As in the optical system for obtaining a copy, the hologram recording film 2013 is intimately adhered to the base of the prism 2022, and a diffused laser beam is incident (in this embodiment, the diffused beam is incident directly onto the master) from the same direction as the direction of the diffused laser beam at the time of recording. The diffused laser beam that has arrived at the master holographic optical element 2011 is diffracted by the master holographic optical element 2011, reflected by the mirror 2012, and falls onto the back surface of the hologram recording film 2013. The zero-order beam that has passed through the master holographic optical element 2011 is reflected by the mirror 2012 and hits the surface 2022b of the prism 2022. Therefore, the zero-order beam can be absorbed by painting the surface 2022b black. Here, the prism image 2022' reflected by the surface 2022b and the mirror 2012 (prism surface 2022c) and the prism image 2022 reflected by the mirror 2012 are described as shown in FIG. 36. It will then be understood that the other diffused laser beam at the time of recording the master travels the optical path shown in FIG. 36. The surface 2022a of the hologram recording film is parallel with the surface 2022a' of the hologram recording film reflected in the mirror 2012. Therefore, the diffused laser beam diffracted by the master holographic optical element 2011 has traveled through a plate consisting of parallel surfaces 2022a and 2022a'. Hence, aberration due to the prism 2022 greatly decreases.

When, for example, the holographic optical element has a small area or when irregularity in the diffraction efficiency is not much of a problem, it is possible to employ a copying method using the reflection-type holographic optical element as a master without relying upon the present invention. In this case, however, the method of canceling the effect of the zero-order beam reflected by the mirror mentioned in the aforementioned embodiment can be applied as a method of eliminating the effect of the reflected light. Described below is an example of an application thereof.

Figure 37:
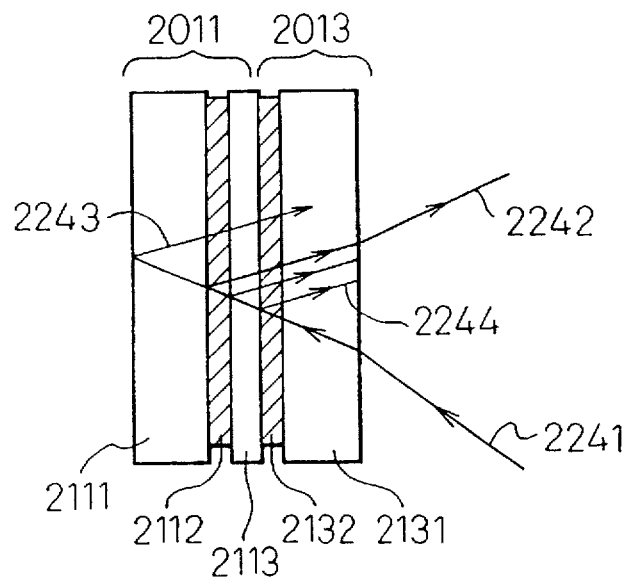
FIG. 37 is a diagram illustrating the vicinity of a hologram recording film in the copying method using a reflection-type holographic optical element shown in FIG. 42.
Figure 42:
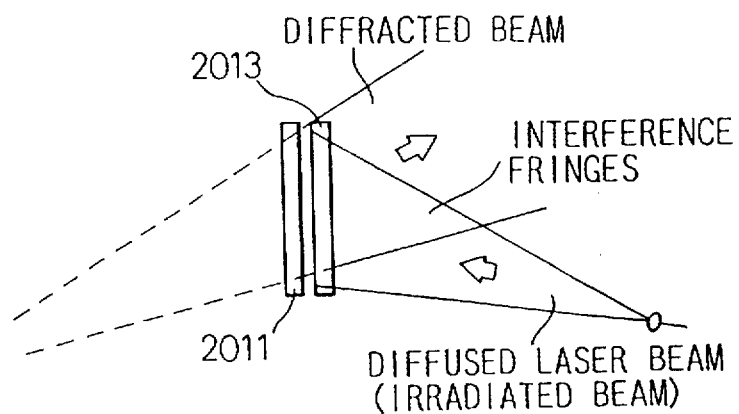
FIG. 42 is a diagram illustrating a method of copying the holographic image for producing the holographic optical element using the conventional reflection-type.
Figure 43:
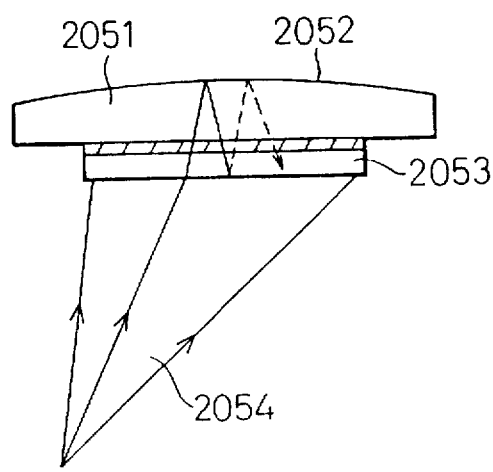
FIG. 43 is a diagram illustrating another method of copying the holographic image.

FIG. 37 is a diagram illustrating the vicinity of the hologram recording film in the copying method by using the reflection-type holographic optical element shown in FIG. 42. As shown, the master holographic optical element 2011 is constituted by a base glass 2111, a holographic film 2112, and a protection glass 2113. To the front surface of the protection glass 2113 is intimately adhered a hologram recording film 2013 constituted by a base glass 2131 and a photosensitive film 2132. The diffused laser beam 2241 that is incident on the front surface is diffracted by the holographic film 2112 to form a diffracted beam 2242, and interference fringes between the diffused laser beam 2241 and the diffracted beam 2242 are recorded on the photosensitive film 2132 and a holographic image is copied. At this moment, the zero-order beam that has passed through the holographic film may be reflected by the back surface of the base glass 2111 to form a beam 2243 reflected by the back surface that is a reflected light. This, however, can be easily coped with by, for example, applying black paint on the back surface. Another reflected light may be the beam 2444 reflected by the interfaces of the glass plates 2111, 2113, 2131 and holographic film 2112 and photosensitive film 2132. To eliminate this reflected light, the refractive indexes must be brought into agreement between the glass plates 211, 2113, 2131, the holographic film 2112 and the photosensitive film 2132. Generally, however, it is difficult to control the respective refractive indexes, or considerable cost is required to overcome these difficulties. Therefore, the method mentioned in the foregoing embodiment is applied as a method of eliminating the effect of the reflected light.

Figure 38:
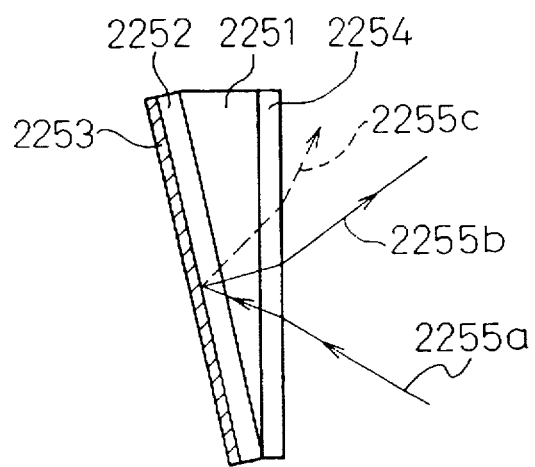
FIG. 38 is a diagram of when the embodiment shown in FIG. 29 is applied.

FIG. 38 is a diagram of the embodiment of FIG. 29 in practice wherein a hologram recording film 2254 is placed on the front surface of a prism 2251, and a master holographic optical element 2252 is placed on the back surface thereof. The back surface of the master holographic optical element 2252 is painted black as designated at 2253 to prevent the zero-order beam from being reflected. A copy beam 2255a incident on the front surface of the hologram recording film 2254 is diffracted by the master holographic optical element 2252 and turns into a diffracted beam 2255b which falls on the back surface of the hologram recording film 2254, so that a holographic image is recorded thereon. Here, the beam 2255c reflected at the interface between a holographic film 2252a (not shown) of the master holographic optical element 2252 and a glass base plate 2252b (not shown) falls on the hologram recording film 2254 at an angle different from that of the diffracted beam 2255b. Therefore, the holographic optical element formed by the reflected light has a direction of incidence of maximum efficiency different from that of the normal holographic optical element. When the display unit is placed in the direction of incidence of a regenerating beam for a normal holographic optical element as shown in FIG. 28, therefore, almost no image is generated by the holographic image that was recorded using the reflected light.

Figure 39:
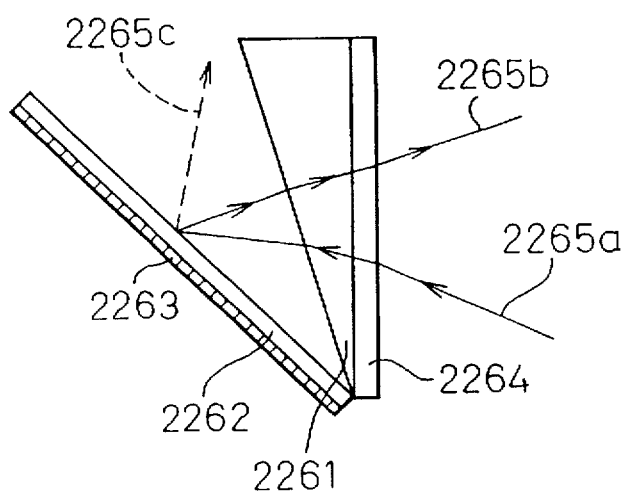
FIG. 39 is a diagram of when the embodiment shown in FIG. 25 is applied.
Figure 40:
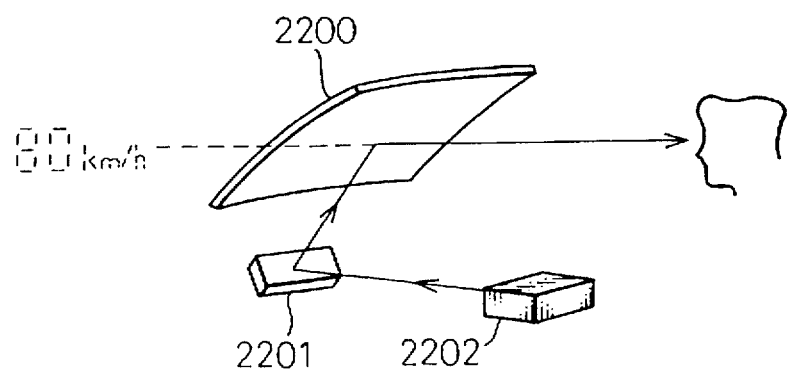
FIG. 40 is a diagram which schematically illustrates the head-up display.
Figure 41:
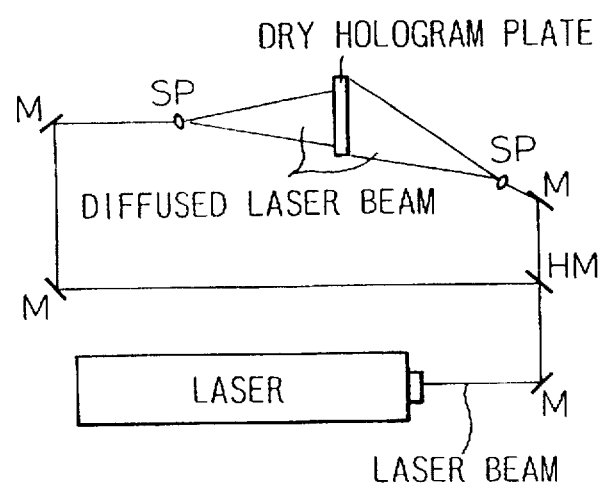
FIG. 41 is a diagram illustrating a two-beam method for producing the holographic optical element using a conventional reflection-type.

FIG. 39 is a diagram of the embodiment of FIG. 25 in practice wherein a hologram recording film 2264 is intimately adhered to the front surface of the prism 2261, a master holographic optical element 2262 is placed on the back surface of the prism 2261, and the back surface of the master holographic optical element 2262 is painted black, as designated at 2263, to absorb the zero-order beam. The copy beam 2265a incident on the front surface of the hologram recording film 2264 passes through the prism 2261, falls on the master holographic optical element 2262, and turns into a diffracted beam 2265b. The diffracted beam 2265b passes again through the prism 2264 and falls on the back surface of the hologram recording film 2264. A beam 2265c reflected by the interface between a holographic film 2262a of the master holographic optical element 2262 and a glass base plate 2262a (not shown) does not fall on the hologram recording film 2264 for obtaining a copy or falls thereon at an angle different from that of the diffracted beam 2265b. Therefore, no image is regenerated by the reflected light as in the case of the embodiment of FIG. 25.

According to the present invention, which employs a transmission-type holographic optical element which has little wavelength selectivity and produces little irregularity in the diffracted beam even upon irradiation with a laser beam as described above, the diffracted beam is reflected by a mirror, and interference with the irradiated beam is recorded on a photosensitive plate, in order to copy a reflection-type holographic optical element having little irregularity in diffraction efficiency and to maintain the optical characteristics that are set at the time of forming the transmission-type holographic optical element. At the time of producing the master holographic optical element, furthermore, the air fluctuation is eliminated by using the prism and an optical system is established in which a prism eliminates the aberration of the prism that is used for obtaining a copy. Thus, the reflected light is not produced and aberration is not generated.

The master holographic optical element may be a reflection-type holographic optical element. When a reflection-type holographic optical element is used as the master holographic optical element, the hologram recording film is placed over the entire surface of the prism, and the master holographic optical element is placed on the tilted surface so as to be disposed obliquely with respect to the hologram recording film to thereby copy the holographic optical element. By using the reflection-type holographic optical element as the master holographic optical element, the normal diffracted beam of the master holographic optical element falls on the hologram recording film at an angle different from that of the reflected light reflected by the back surface of the master holographic optical element, or the reflected light does fall not at all on the hologram recording film. Therefore, the effect due to the reflected light can be eliminated.

Figure 48:
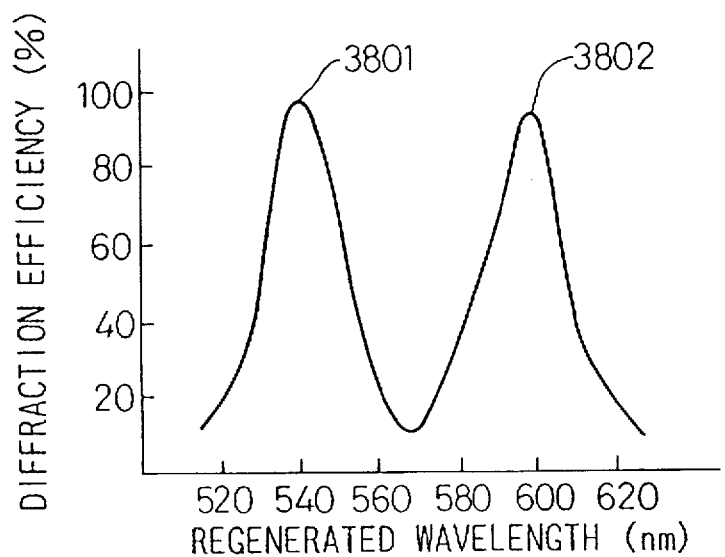
FIG. 48 is a diagram illustrating diffraction characteristics of a conventional two-color holographic optical element.

In a head-up display or the like, main information and sub-information can be displayed in different colors using a two-color holographic optical element. As shown in FIG. 48, the two-color holographic optical element has a plurality of wavelength bands that exhibit maximum values of diffraction efficiency. When different display images are placed on the wavelength bands that exhibit maximum values, display images of colors corresponding to the wavelength bands can be regenerated.

To produce a multi-color holographic optical element capable of regenerating images with a plurality of colors, there has been known a multiple exposure method according to which reference light beams having the same wavelength are permitted to fall on a piece of hologram recording film (photosensitive material) from different angles of incidence a plurality of times.

Figure 49:
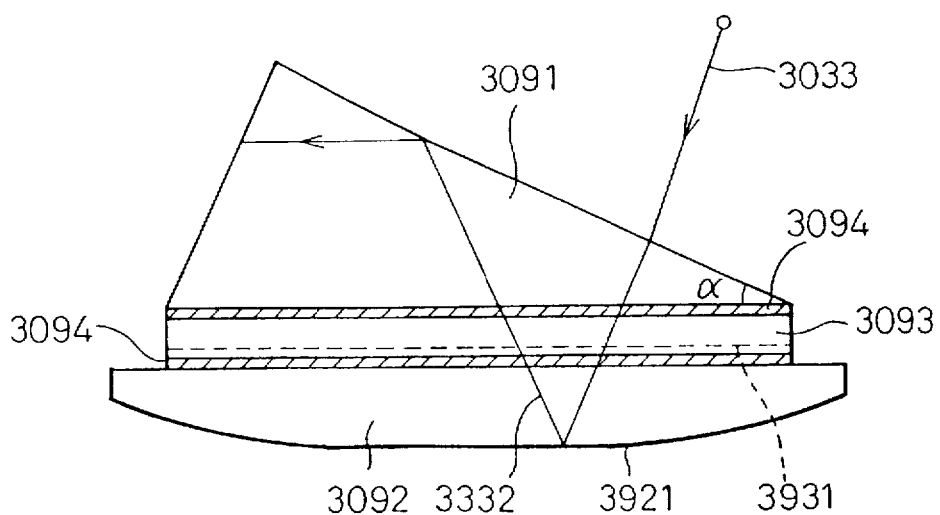
FIG. 49 is a diagram illustrating a conventional step of exposing the holographic optical element to light.

When, for example, a magnifying glass (spherical mirror, etc.) is to be recorded in the holographic optical element, a reference beam 3033 is made incident to a prism 3091 as shown in FIG. 49, and interference fringes are formed on a hologram recording film 3093 by the reference beam 3033 and an object beam 3332 reflected by a reflection film 3921 of a spherical form provided on the lower surface of the lens 3092.

The angle of incidence of the reference beam 3033 is changed to effect multiple exposure thereby to obtain diffraction characteristics having two maximum values 3801 and 3802 as shown in FIG. 48.

In FIG. 49, reference numeral 3931 denotes a photosensitive material and 3094 denotes a solution for adjusting the refractive index.

According to the method of producing a multi-color holographic optical element by changing the angle of incidence of the reference beam as described above, the reference beam of only one kind of wavelength needs be used making it possible to carry out the multiple exposure using a small number of optical parts.

The holographic image which has recorded the spherical mirror has diffraction characteristics for enlarging the image in addition to two-color characteristics, and is used for a head-up display or the like.

Figure 50:
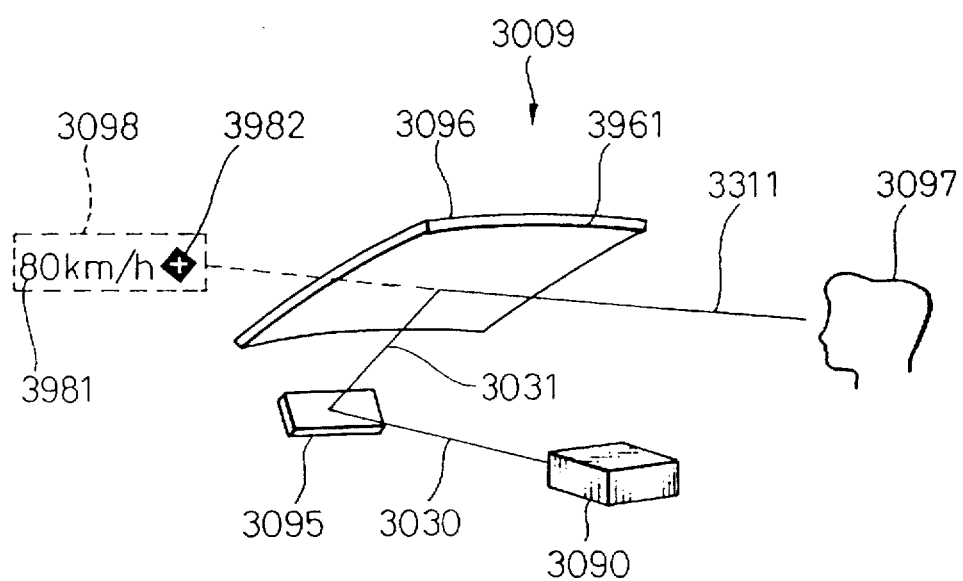
FIG. 50 is a diagram illustrating a conventional head-up display.

As shown in FIG. 50, the head-up display 3009 is one in which an incident beam 3030 related to an image 3098 to be displayed emitted from a display unit 3090 is diffracted and is reflected by a holographic optical element 3095 so as to be enlarged, and the regenerated beam 3031 thereof is reflected by a film 3961 deposited on a windshield 3096, so that a reflected beam 3311 is observed by a driver 3097.

The display image 3098 of the head-up display 3009 includes main information 3981 such as speed and the like and sub-information 3982 such as alarms and the like, which are displayed in different colors using a two-color holographic optical element.

When the holographic optical element recording the spherical mirror as a magnifying glass is used for the head-up display or the like, the display image tends to be distorted due to spherical aberration when the magnification is increased. To cope with this, therefore, a method has been proposed for decreasing the distortion by recording a non-spherical mirror of which the aberration is corrected.

Figure 51:
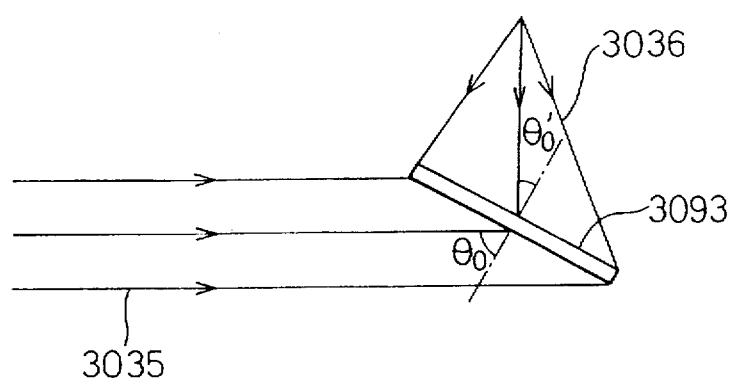
FIG. 51 is a diagram illustrating another conventional step for exposing the holographic optical element to light.
Figure 52:
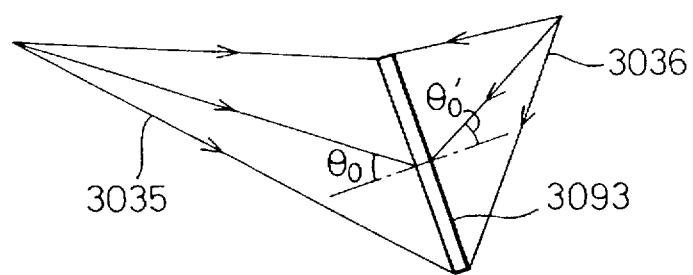
FIG. 52 is a diagram illustrating a still further step of exposing the holographic optical element to light.

As shown in FIGS. 51 and 52, therefore, a method (two-beam method) has been used for recording the non-spherical lens by projecting light beams 3035 and 3036 having different wave fronts onto both sides of the hologram recording film 3093.

In the method of producing a multi-color holographic optical element by the two-beam method, however, when the multiple exposure is carried out by changing the angle of incidence of the recording beams (light beams 3035, 3036) on the hologram recording film at the time of exposure to obtain an image in many colors, a large difference occurs between the angle of incidence of the incident beam at the time of regeneration and the angle of incidence at the time of exposure. This causes aberration of the regenerated beam to become conspicuous and the display image to be greatly distorted.

The present invention was accomplished in view of the above-mentioned problems, and provides a method of producing a holographic optical element which is capable of easily recording the nonspherical lens and of easily producing a multi-color holographic optical element of good quality with small aberration.

A fourth embodiment of the present invention will now be described with reference to FIGS. 44 to 46.

Figure 44:
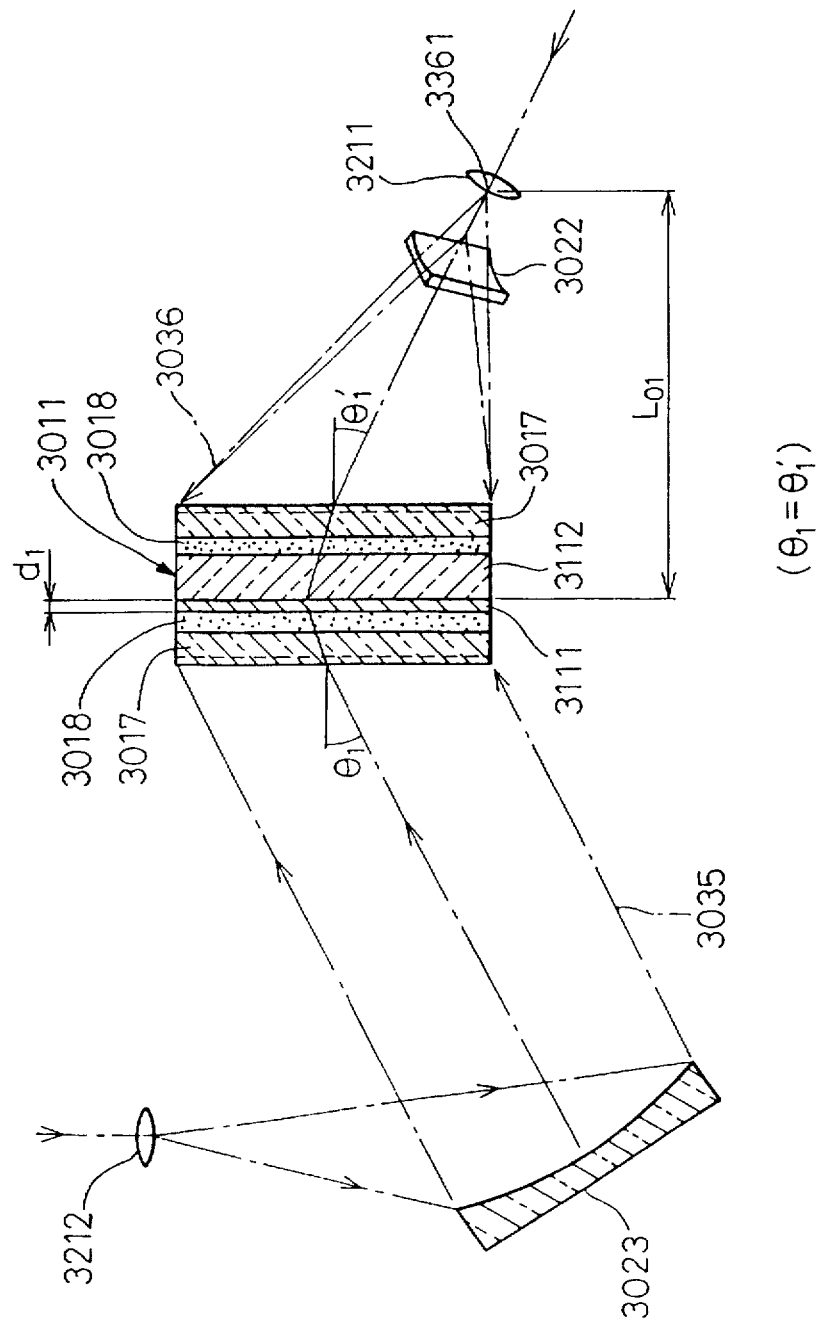
FIG. 44 is a diagram illustrating an optical system in a step of exposure to light according to a fourth embodiment of the present invention.
Figure 45:
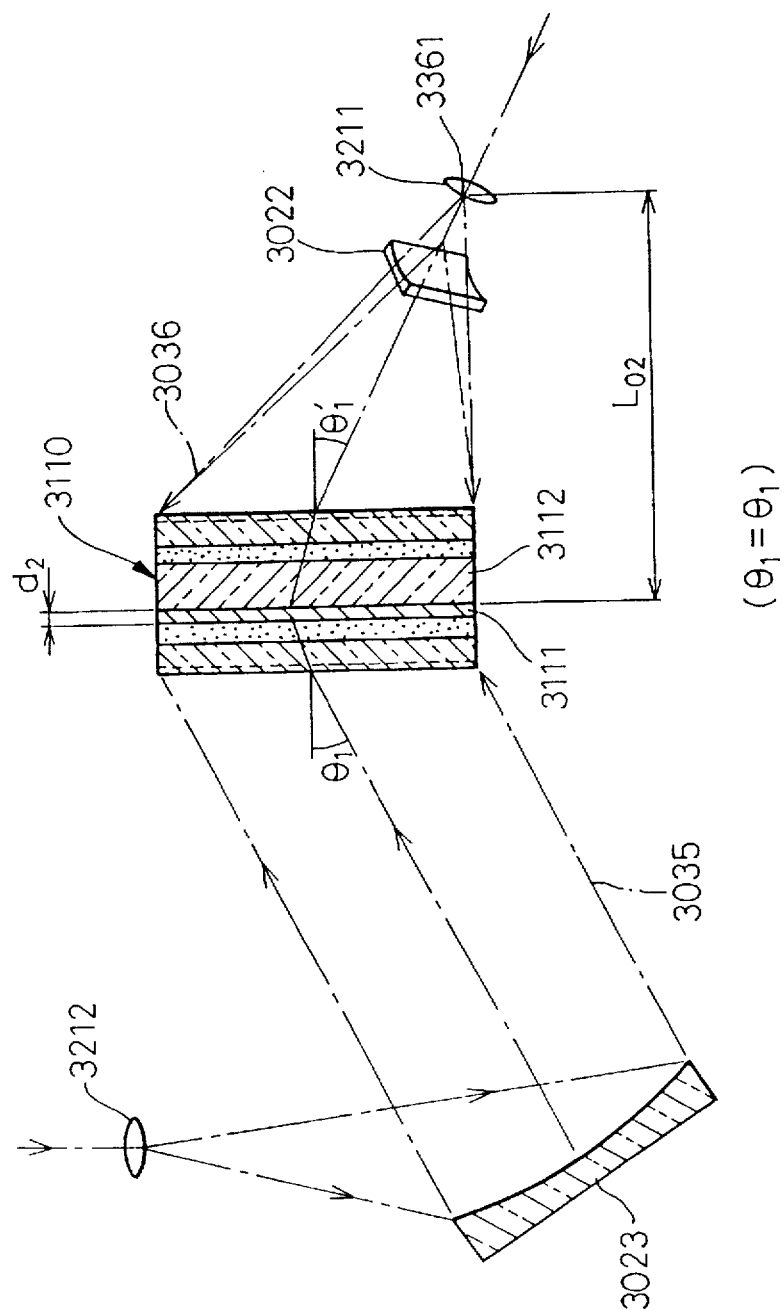
FIG. 45 is a diagram illustrating the optical step in a second step of exposure to light according to the fourth embodiment of the present invention.

According to this embodiment as shown in FIGS. 44 and 45, a first light beam 3035 and a second light beam 3036 having different wave fronts are projected to both the right and left sides of a hologram recording film 3011 to form a holographic optical element.

According to this method of producing a two-color holographic optical element, the exposure is carried out while decreasing the thickness d of the photosensitive material of the hologram recording film 3011 from a predetermined value $d_1$ (FIG. 44) down to another predetermined value $d_2$ (FIG. 45) ($d_1 > d_2$), the first and second light beams 3035 and 3036 are projected from nearly the same direction in these steps of exposure in order to form the interference fringes twice.

In the interference fringes formed by the aforementioned double exposure is recorded a magnifying glass having nearly the same reflection characteristics and enlarging function as will be described later, and the two-color holographic optical element is used for the head-up display.

Furthermore, the first light beam 3035 is a parallel beam and the second light beam 3036 is a diverging beam.

In the step of exposure of the second time shown in FIG. 45, the exposure is carried out by selecting the distance $L_{02}$ between the point of divergence 3361 at which the beam (second light beam 3036) is diverging and the hologram recording film 3011 to be slightly larger than the distance $L_{01}$ in the step of exposure of the first time ($L_{02} > L_{01}$).

The first and second light beams 3035 and 3036 are the light beams obtained by dividing into two the beam emitted from a laser, using a half mirror, that is not shown.

Each of these beams will now be described in detail.

The hologram recording film 3011 is obtained by forming a photosensitive material 3111 on a base member 3112 such as a soda glass by adhering gelatin dichromate, which is a photosensitive material, at a thickness of about 25 µm.

Described below is the first exposure step.

As shown in FIG. 44, the hologram recording film 3011 is held by optical glasses 3017 treated with a reflection-preventing film via a solution 3018 for adjusting the refractive index, and is irradiated with the first beam 3035 and the second beam 3036 through both surfaces thereof.

The first and second beams 3035 and 3036 are emitted from the same laser having a wavelength of 514.5 nm.

The first beam 3035 is part of the beam emitted by the laser, and travels through a diverging lens 3212 and an out-of-axis parabolic reflector 3023, and is incident as a parallel beam on the hologram recording film 3011.

The second beam 3036, on the other hand, is another part of the beam emitted from the above laser, and travels through the diverging lens 3211 and a cylindrical lens 3022 for correcting aberration, and is incident, as a diverging beam, on the other surface of the hologram recording film 3011.

Figure 46:
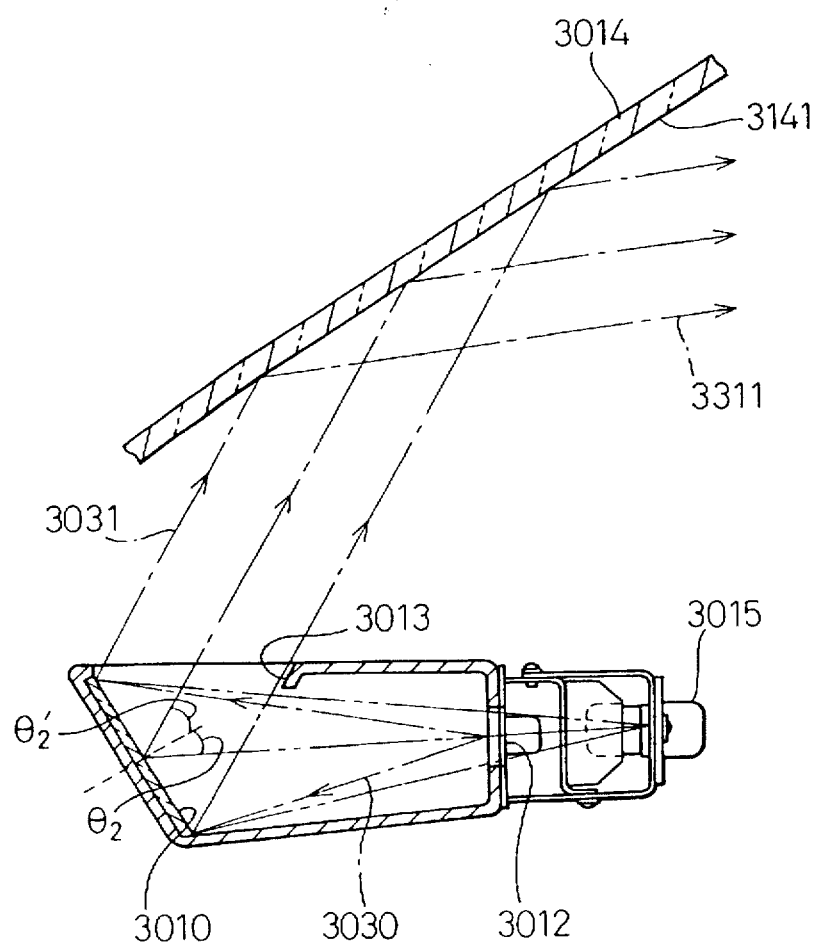
FIG. 46 is a diagram illustrating the head-up display according to the fourth embodiment of the present invention.

The angles of incidence $\theta_1$ and $\theta_1'$ of the first beam 3035 and the second beam 3036 are both in agreement with the angle of incidence $\theta_2$ at the time of regeneration shown in FIG. 46 (in this embodiment, $\theta_1 = \theta_1' = \theta_2$ 33.5°).

In the above-mentioned optical system, the optical glass 3017 and the solution 3018 for adjusting the refractive index are removed after the first exposure. The hologram recording film 3011 is left to stand for about 10 minutes in a vacuum state (about 0.01 Torr), so that the photosensitive material 3111 of the hologram recording film 3011 is shrunk by about 10%.

Then, as shown in FIG. 45, the hologram recording film 3110 having the photosensitive material 3111 that is shrunk is subjected to a second exposure using the same optical system as that of the first exposure.

In the second exposure, the lens 3211 in the optical path of the second beam 3036 and the cylindrical lens 3022 are moved further away from the hologram recording film 3110 than in the first exposure to increase the distance $L_{02}$ between the hologram recording film 3110 and the point of divergence 3361 of the second beam 3036 ($L_{02} > L_{01}$).

The other points are the same as those of the first exposure, and laser beams of the same wavelength as that of the first exposure are used as the first and second beams 3035 and 3036. In the second exposure, the hologram recording film 3110 is shrunk as described above, so that the regenerated beam of the first holographic optical element due to the first exposure will have a wavelength $\lambda_1$ which is different from a wavelength $\lambda_2$ of the regenerated beam of the second hologram due to the second exposure ($\lambda_2 > \lambda_1$).

If the first exposure and the second exposure are carried out under the same conditions, aberration occurs due to a difference in the regenerated wavelengths and a difference occurs in the magnification factor of the magnifying glass that is recorded. The difference, however, can be decreased by adjusting the distances $L_{o1}$, $L_{o2}$ ($L_{o2} > L_{o1}$) between the point of divergence 3361 and the hologram recording film 3011 and 3110 as described above.

A multiple holographic optical element produced through the above-mentioned steps is held by cover plates with an epoxy resin sealing agent interposed therebetween in the next step.

On one surface of the cover plate a reflection-preventing film for preventing light from being reflected by the surface is formed and on the other surface thereof a scatter-preventing film for preventing light from being scattered by the surface is formed.

Mentioned below are the actions and effects of the method of producing a holographic optical element according to this embodiment.

In the method of producing a holographic optical element according to this embodiment, the thicknesses of the hologram recording film 3011 and 3110 are changed (decreased), and exposure is effected using nearly the same pair of beams 3035 and 3036.

Despite of using the same pair of beams, the regenerated beams have different wavelengths since the hologram recording film have different thicknesses and, as a result, a two-color holographic optical element having characteristics as shown, for example, in FIG. 48 is formed.

The angle of incidence $\theta_2$ of the beam at the time of regeneration can be the same as the angle of incidence $\theta_1$ of the beam for exposure.

Unlike the method of producing the multi-color holographic optical element by effecting the exposure a plurality of times by changing the angle of incidence $\theta_1$ of the beam at the time of exposure, therefore, no aberration results from a difference between the angle of incidence at the time of regeneration and the angle of incidence at the time of exposure ($\theta_1 \neq \theta_2$).

In this embodiment, the exposure is carried out by using a parallel beam and a diverging beam, whereby the image recorded in the holographic optical element is an enlarged image.

It is thus made possible to obtain a two-color holographic optical element having diffraction/reflection characteristics that can be used for a head-up display or the like.

Moreover, since the exposure is carried out by the two-beam method, aberration can be easily corrected by placing an optical element at an intermediate point in the optical paths of beams 3035 and 3036. Thus, a vivid image is displayed without spherical aberration.

These steps of exposure use nearly the same pair of light beams, and nearly the same magnifying glasses are recorded in two holographic optical elements if the hologram recording film have the same thickness. In this embodiment in which the thicknesses of the hologram recording film are changed, however, the magnification factor of the magnifying mirror varies depending upon the holographic optical element since the regenerated waveform varies.

In this embodiment, however, the magnification factors of the magnifying mirrors of the two holographic optical elements at the time of the regeneration can be set to be nearly the same by changing the distances $L_{o1}$ and $L_{o2}$ between the hologram recording films and the point of divergence.

As a result, it becomes possible to obtain an ideal two-color holographic optical element having the same magnification factor despite the fact that the regenerated wavelengths are different.

Mentioned below is the case were the above-mentioned two-color holographic optical element is used for the head-up display shown in FIG. 46.

The incident beam 3030 including light of two different wavelengths ($\lambda_1$=540 nm, $\lambda_2$=600 nm) emitted from the display unit 3012 is diffracted and reflected by the holographic optical element 3010 mounted at a predetermined angle $\theta_2$ (=33.5°) with respect to the optical axis thereof.

The regenerated beam 3031 passes through an opening 3013 formed in an upper portion, and is reflected by a room side surface 3141 on a windshield 3014 on the inside, and the reflected beam 3311 enters the eyes of a driver, not shown.

In FIG. 46, reference numeral 3015 denotes a source of light.

When, for example, the display unit 3012 displays the speed or the like using a short wavelength band ($\lambda_1$=540 nm) and displays an alarm or the like using a long wavelength band ($\lambda_2$=600 nm), then, the driver can view two kinds of display images in different colors (540 nm, 600 nm).

The two display images have the same magnification factor.

According to the method of production of this embodiment, the two-color holographic optical element having very small aberration can be easily obtained by effecting the exposure twice under nearly the same conditions owing to the provision of a step of shrinking the hologram recording film through vacuum treatment.

According to this embodiment as described above, a nonspherical lens is easily recorded and, hence, a method of easily producing a multi-color holographic optical element 3010 with little aberration is provided.

In this embodiment, the photosensitive material of the hologram recording film was shrunk through the vacuum treatment. The hologram recording film, however, may be shrunk by any other method such as drying.

In the step of exposure of the second time, furthermore, the holographic optical element may be swollen to increase its thickness d ($d_2 > d_1$).

The photosensitive material may be any material provided it can be swollen or contracted, and is in no way limited to gelatin dichromate.

In this embodiment, furthermore, double holographic optical elements were formed by effecting the step of exposure twice. It is, however, also possible to form triple holographic optical elements (three colors) by effecting the exposure three times.

According to this embodiment in which the beam is regularly reflected ($\theta_2 = \theta_2'$ in FIG. 46) by the holographic optical element, the two recording beams are incident at nearly the same angle ($\theta_1 = \theta_2'$) on the hologram recording film at the time of exposure. Even when the beam is irregularly reflected such as when the holographic optical element is near the windshield, a multi-color irregularly reflected holographic optical element can be obtained if the exposure is effected while controlling the thickness of the film by bringing the angle at the time of recording into agreement with the angle at the time of regeneration.

Figure 47:
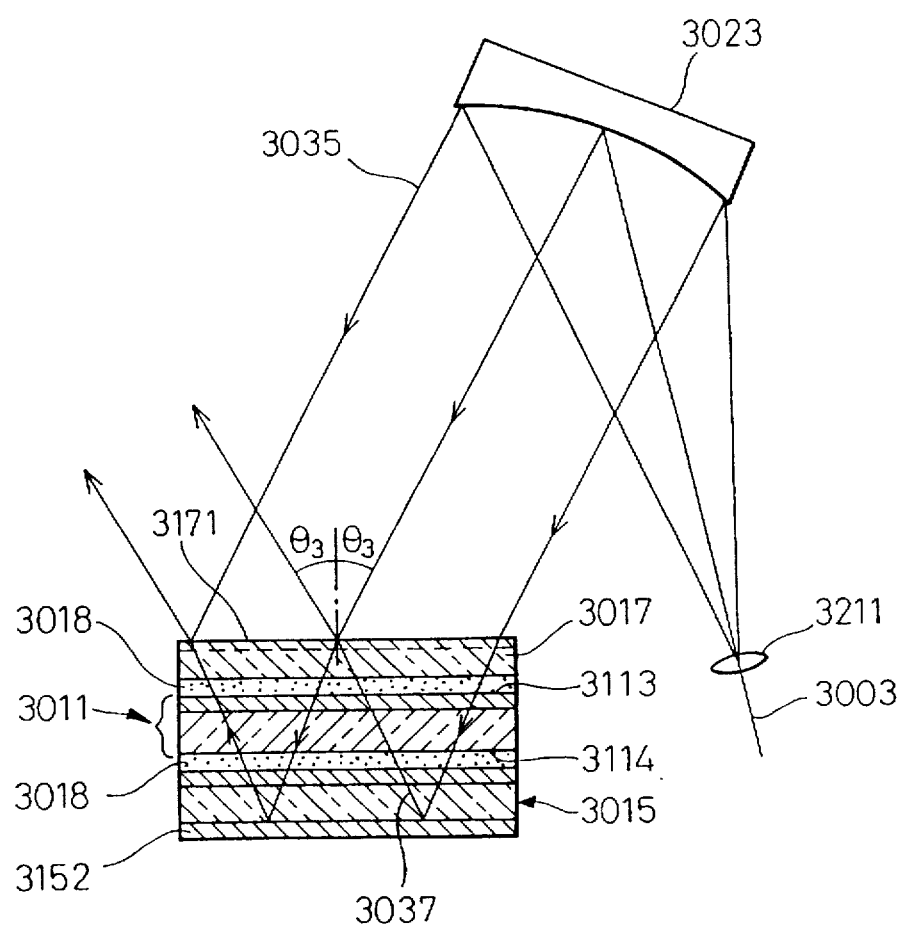
FIG. 47 is a diagram illustrating the exposure to light according to a further embodiment.

FIG. 47 illustrates a further embodiment in which the second beam 3037 incident on the other surface 3114 of the hologram recording film 3011 in the step of exposure of the fourth embodiment is diffracted and reflected by the reflection-type master holographic optical element 3015 to regenerate the beam.

That is, a beam 3003 emitted from a laser oscillator is diverged by a diverging lens 3211, reflected by an out-of-axis parabolic reflector 3023 to form a first beam 3035 which, then, falls on a first surface 3113 of the hologram recording film 3011.

Part of the first beam 3035 passes through the hologram recording film 3011, is diffracted and reflected by the master holographic optical element 3015 and falls as a second beam 3037 on a second surface 3114 of the hologram recording film 3011.

In FIG. 47, reference numeral 3171 denotes a reflection-preventing film, and 3152 denotes a scatter-preventing film. In other respects, the embodiment is the same as the fourth embodiment.

It is also allowable to use a prism (see reference numeral 3091 of FIG. 49) instead of the flat optical glass 3017.

It is further allowable to use a transmission-type master holographic optical element and a reflector in combination instead of the reflection-type master holographic optical element 3015. Moreover, a copying lens may be used instead of the master holographic optical element 3015.

In recent years, attention has been given to a head-up display which displays information such as speed, alarm and the like in front of the windshield of an automobile. As a display device used for the head-up display, there has been proposed one utilizing diffraction/reflection characteristics having holographic wavelength selectivity.

Figure 57:
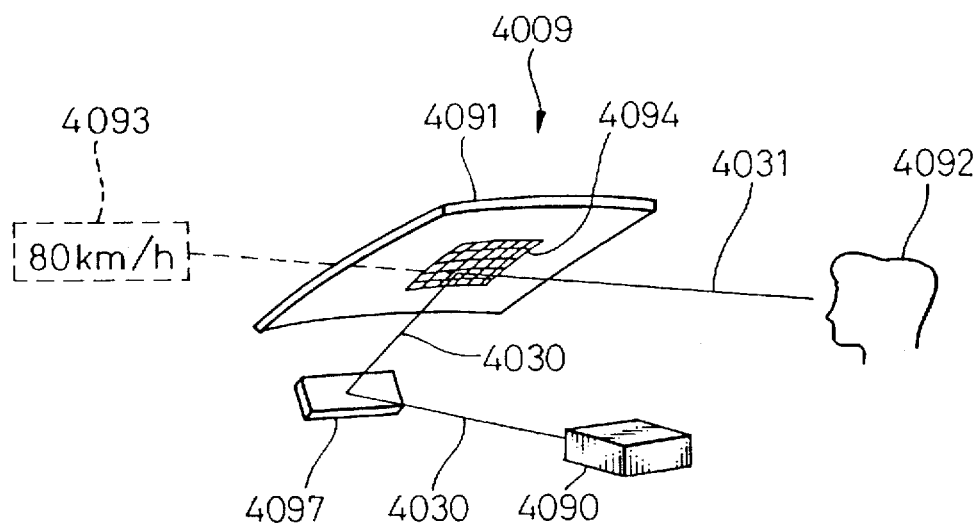
FIG. 57 is a diagram illustrating a conventional head-up display.

In a head-up display 4009 as shown, for example, in FIG. 57, an incident beam 4030 related to an image to be displayed emitted from a display unit 4090 is permitted to fall on a holographic device 4094 held in a windshield 4091 directly or via an optical element 4097 for reflection.

A driver 4092 perceives a regenerated beam 4031 diffracted and reflected by the holographic device 4094 and observes the image 4093 that is displayed as a virtual image displayed in front of the windshield 4091.

According to a further embodiment, a holographic device is arranged at a position of the holographic optical element 4097 for reflection, and a film for reflection is deposited by vaporization on the surface of the windshield 4091.

In this constitution, the beam 4031 regenerated by the holographic device is reflected by the windshield 4091 to enter into the eyes of the driver 4092.

Figure 58:
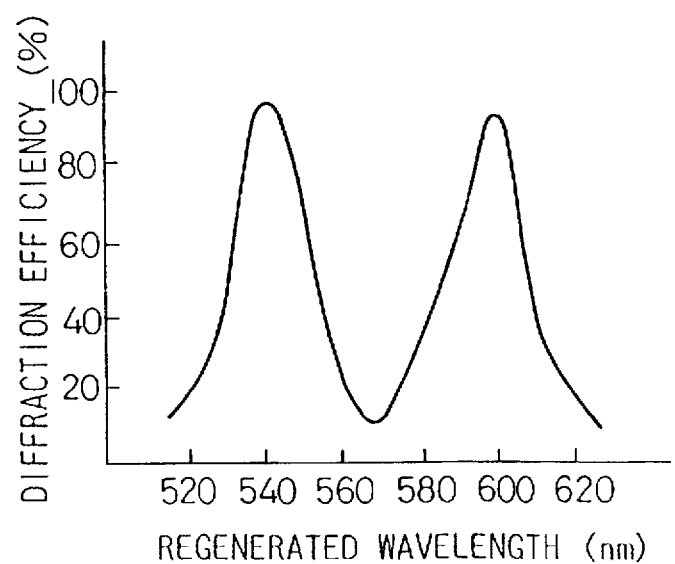
FIG. 58 is a diagram illustrating the diffraction efficiency of a two-color-display holographic optical element.

The hologram device has diffraction/reflection characteristics of a magnifying glass which magnifies the image to be displayed. There has further been employed, as shown in FIG. 58, a two-color display method which displays separate images in different colors (wavelengths) by utilizing changes (wavelength characteristics) in the diffraction efficiency of the holographic optical element caused by the wavelength. For instance, main information such as speed and the like and sub-information such as alarms and the like are displayed in different colors (wavelengths).

Here, when the diffraction/reflection characteristics of the holographic device are those of a spherical lens, an increase in the magnification factor brings about a problem in that the image is distorted due to spherical aberration.

The aberration can be suppressed by using a holographic device having diffraction/reflection characteristics which are those of a nonspherical lens such as of an out-of-axis parabolic reflector.

However, the conventional head-up display has the following problem in that it is very difficult to produce a two-color display holographic optical element which maintains a predetermined magnification factor and low aberration.

The holographic optical element for two-color display having peak diffraction efficiencies at two wavelengths as shown in FIG. 58 is produced by effecting the exposure twice at different angles of incidence during the exposure step (recording) and by forming two kinds of interference fringes.

At the time of regeneration, on the other hand, since the beam is incident from a predetermined angle, the angle of incidence of beam changes depending upon recording and regeneration, and aberration becomes distinct at the time of regeneration.

This can be avoided by correcting the aberration in advance at the time of recording the holographic image. However, effecting the exposure twice while correcting the aberration and changing the angle makes the optical system for exposure complex and makes it difficult to construct the optical system. Moreover, it is not technically easy to produce a corrected nonspherical lens to copy.

As described above, it is not easy to produce a holographic optical element for a two-color display having small aberration.

In some display devices that have two-color displays such as head-up displays and the like, one of the two display colors must be clearly displayed without distortion but the other one may not require a high image quality.

For instance, main information such as speed and the like on the head-up display will have to be clearly displayed but distortion in the image is not much of a problem for sub-information such as a flashing alarm.

In view of the problems inherent in the two-color display device employing a conventional holographic optical element, the present invention provides a multi-color display device that can be easily produced and which has generally small aberration and does not distort a display image of at least one color or make it obscure despite the fact that the magnification factor of the image is increased.

The display device according to a fifth embodiment of the present invention will now be described with reference to FIGS. 53 to 55.

This embodiment is concerned with a head-up display 4001 in which an incident beam 4030 emitted from a display unit 4013 is diffracted and reflected by a holographic device 4012, so that a regenerated beam 4031 thereof can be viewed by an observer.

The above holographic device 4012 contains a plurality of holographic optical elements having different wavelength selectivities and reflection characteristics, and the plurality of reflection characteristics include the reflection characteristics of a spherical lens and of a nonspherical lens in which the aberration has been corrected.

The regenerated beam 4031 of the hologram device 4012 enters into the eyes of the observer from the windshield 4011 of the vehicle, and the observer views the displayed image at a position in front of the windshield 4011.

Moreover, the holographic device 4012 is a multiple holographic optical element obtained by recording a plurality of interference fringes in a multiplexed manner on a piece of photosensitive plate.

Each of the display unit 4013 and the holographic device 4012 will be described below in detail.

Figure 53:
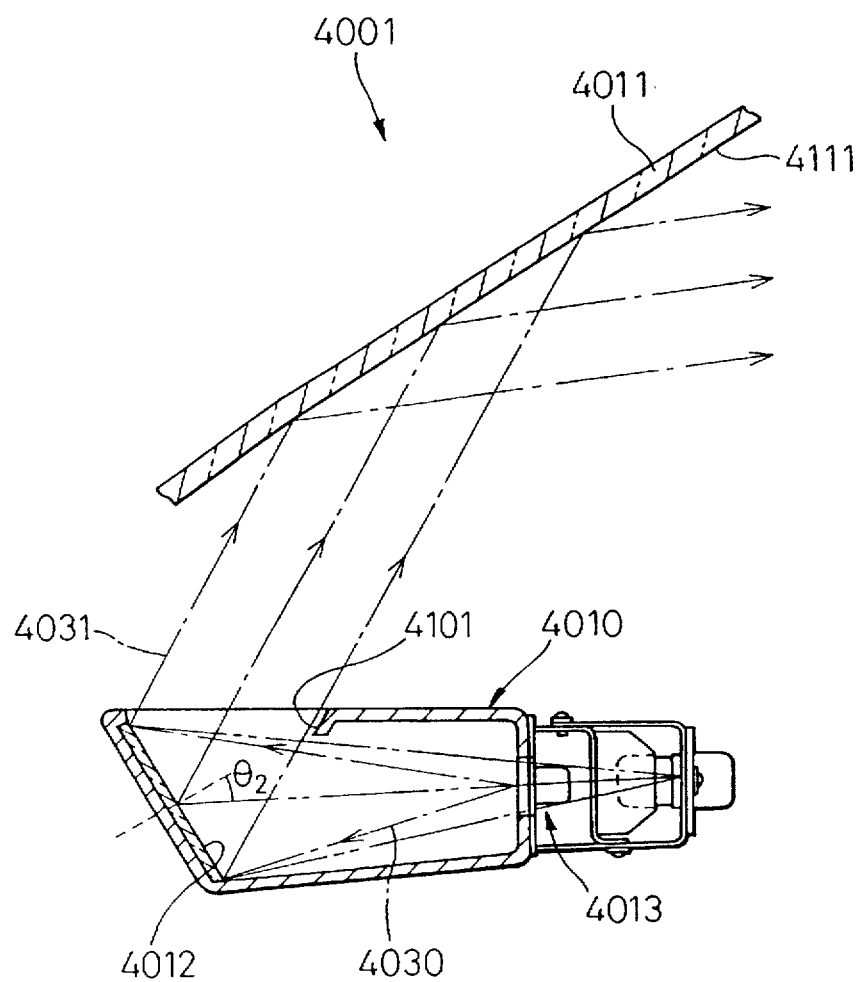
FIG. 53 is a diagram illustrating the head-up display according to a fifth embodiment of the present invention.

Referring to FIG. 53, a main body 4010 containing the display unit 4013 and the holographic device 4012 is mounted inside an instrument panel of an automobile that is not shown.

To one end of the main body 4010 formed in the shape of a box is attached the display unit 4013 which comprises a liquid crystal display, an EL display unit, a CRT or the like.

The display unit 4013 is driven by a display control circuit that is not shown and displays the speed of a car, alarms, etc. By using an optical filter or the like, the display unit 4013 displays the main information, such as speed or the like, by emitting light at 540 nm or shorter and displays sub-information, such as an alarm or the like, by emitting light of 600 nm or longer.

The display image of the above two wavelengths may be obtained by using two fluorescent display tubes (VFD) that emit waves of different wavelengths.

At the other end of the main body 4010 is disposed the holographic device 4012 that receives incident beam 4030 related to the display image emitted from the display unit 4013.

The windshield 4011 is disposed above the opening 4101, and a film for reflecting the regenerated beam 4031 is deposited by vaporization on the room side surface 4111 of the windshield 4011 on the inside. The vapor-deposited film is a semitransparent reflection film formed by vapor-depositing titanium oxide or the like.

On the holographic device 4012 are recorded, in a multiplexed manner, a fist holographic optical element that exhibits a high diffraction efficiency in a wavelength band near 540 nm that displays main information, such as speed, and a second holographic optical element that exhibits a high diffraction efficiency in a wavelength band near 600 nm that displays sub-information, such as alarms.

In the first holographic optical element is recorded a nonspherical lens having small aberration and in the second holographic image is recorded a spherical lens.

Described below is a method of producing the above-mentioned holographic device.

Figure 54:
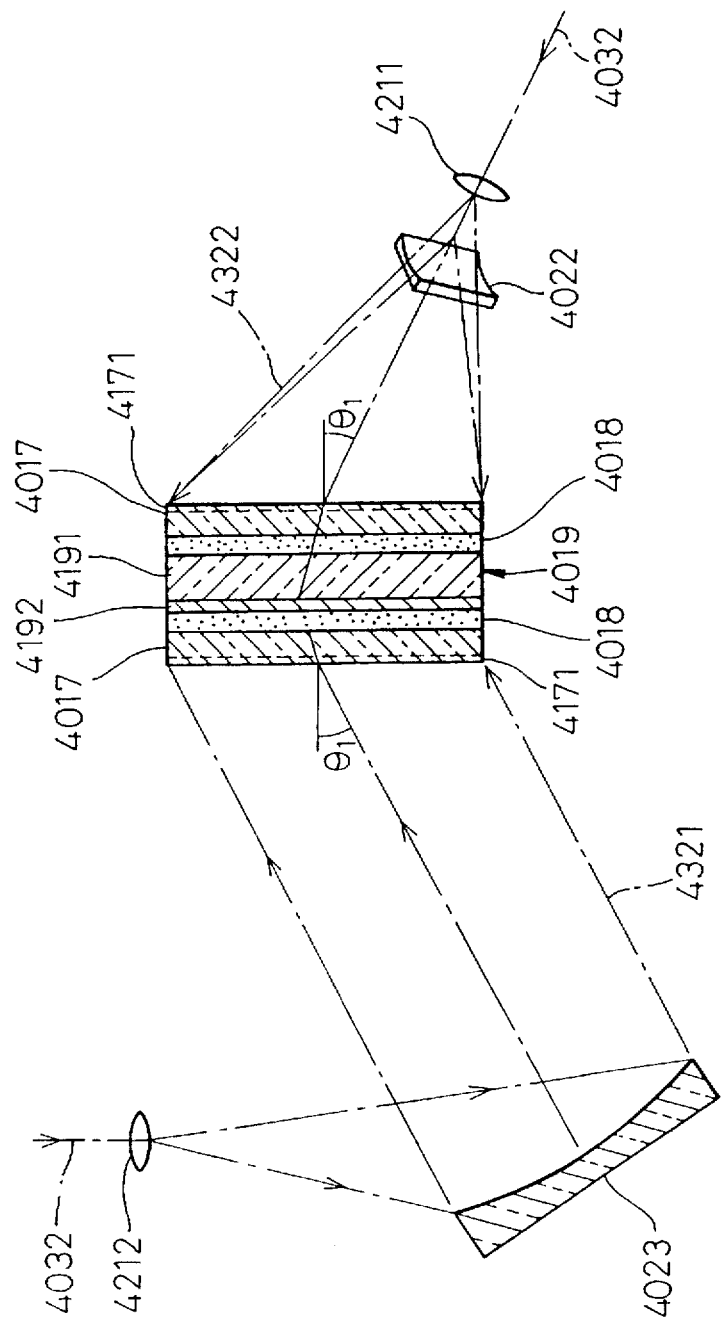
FIG. 54 is a diagram illustrating a step of exposing a holographic optical element to light, the holographic optical element recording a nonspherical lens and being used for the head-up display according to the fifth embodiment of the present invention.

The hologram recording a nonspherical lens is exposed to light using an optical system, shown in FIG. 54, wherein a hologram recording film 4019 is obtained by adhering gelating dichromate 4192, which is a photosensitive agent, at a thickness of about 25 μm, onto a base member 4191 made of a soda glass or the like.

As shown in FIG. 54, the hologram recording film 4019 is held by optical glasses 4017 via a solution 4018 for adjusting the refractive index and is irradiated with recording beams 4321 and 4322 from both sides thereof.

On the outer surfaces of the optical glass 4017 are formed reflection-preventing films 4171 for preventing the recording beams 4321 and 4322 from being reflected.

The recording beams 4321 and 4322 are a parallel beam 4321 and a diverging beam 4322.

A laser beam of, for example, 514.5 nm is used as a source of recording beams 4321 and 4322.

That is, the laser beam 4032 emitted by a laser, not shown, is incident, through the diverging lens 4311 and the cylindrical lens 4022 for correcting aberration, upon one surface of the hologram recording film 4019 as a diverging beam 4322. According to this embodiment, the distance between the diverging lens 4211 and the hologram recording film 4019 is 400 mm.

On the other surface of the hologram recording film 4019 is incident, as a parallel beam 4321, the laser beam 4032 emitted from the same laser via the diverging lens 4212 and the out-of-axis parabolic reflector 4023.

The angle of incidence $\theta_1$ of the parallel beam 4321 and of the diverging beam 4322 in FIG. 54 is brought into agreement with the angle of incidence $\theta_2$ of the incident beam 4030 at the time of regeneration shown in FIG. 53 (e.g., $\theta_1=\theta_2=33.5°$).

A spherical lens is further recorded through the following step on the hologram recording film 4190 on which the nonspherical lens has been recorded through the above-mentioned step of exposure.

Figure 55:
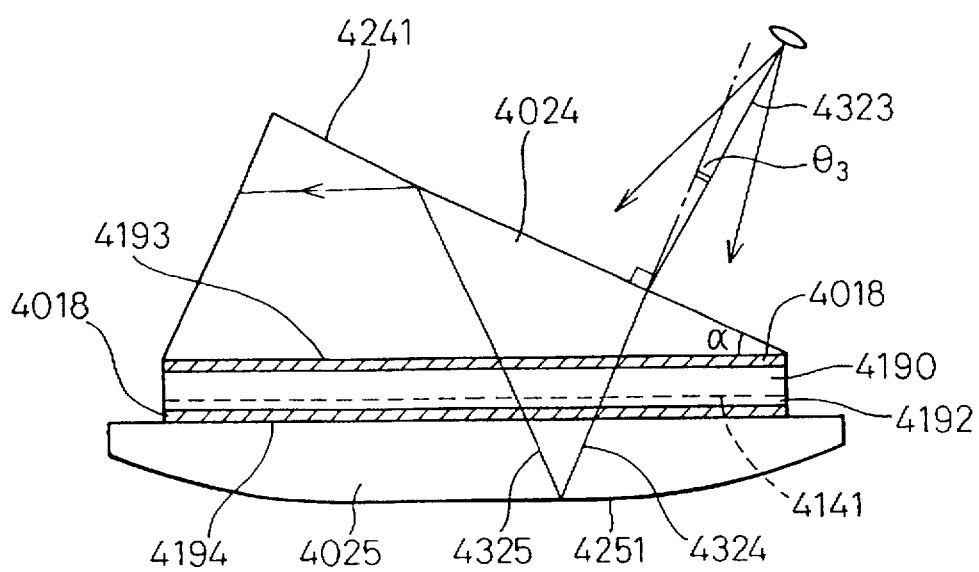
FIG. 55 is a diagram illustrating a step of exposing a holographic optical element to light, the holographic optical element recording a spherical lens and being used for the head-up display according to the fifth embodiment of the present invention.

That is, as shown in FIG. 55, the hologram recording film 4190 is held by a prism (vertical angle $\alpha=30°$) and a spherical lens 4025 (f=400) via the solution 4018 for adjusting the refractive index, and a predetermined diverging laser beam 4323 is permitted to fall on a first surface 4241 of the prism 4024.

The angle of incidence $\theta_3$ of the diverging laser beam 4323 upon the first surface 4241 of the prism 4024 is so set that the beam regenerated by the holographic optical element having a high diffraction efficiency will have a wavelength of 600 nm for the sub-information ($\theta_3=4.5°$ in this embodiment).

The diverging laser beam 4323 falls on the prism 4024, falls on one surface 4193 of the hologram recording film 4190, is reflected by the bottom surface 4251 of the lens 4025 and falls on the other surface 4194 of the hologram recording film 4190.

Interference fringes are formed on the hologram recording film 4190 by the laser beam 4323 and the reflected beam 4325.

The hologram recording film 4190 in which the spherical lens and the nonspherical lens are recorded in a multiplexed manner through the above-mentioned two exposure steps, then, turns into a multiple-recorded holographic optical element through the subsequent steps of developing and fixing.

The holographic optical element is then held by cover plates via a sealing agent of an epoxy-type resin. On one surface of the cover plate is formed a reflection-preventing film for preventing the beam from being reflected and on the other surface thereof is formed a scatter-preventing film for preventing the beam from being scattered, thereby to obtain a holographic optical element.

As described above, the holographic optical element according to this embodiment is easily fabricated by effecting an ordinary step of exposing the holographic optical element two times consecutively.

The holographic device 4012 is mounted in the main body 4010 of the head-up display 4001 as shown in FIG. 53 and is disposed at a position 240 mm away from the display unit 4013, so that the angle of incidence $\theta_2$ of the incident beam 4030 from the display unit 4013 becomes nearly equal to the angle of incidence $\theta_1$ of the recording beams 4321 and 4322 (FIG. 54).

In the holographic device 4012, the holographic optical element containing the nonspherical lens image has no difference in the angle of incidence between that of the moment of recording and that of the moment of regeneration and, hence, reduces aberration to a small value.

The incident beam 4030 emitted from the display unit 4013 is diffracted and reflected at high efficiency and falls, as regenerated beam 4031, on the windshield 4011.

Being reflected by the windshield 4011, the regenerated beam enters the eyes of an observer who then views an image that appears to be in front of the windshield 11.

Main information emitted having a wavelength of about 540 nm or shorter is diffracted and reflected by the first holographic optical element containing the image of the nonspherical lens and appears as a clear image with almost no distortion even when it is enlarged by two or more times (2.5 times in this embodiment).

On the other hand, sub-information having a wavelength of about 600 nm or longer is diffracted and reflected by the second holographic optical element containing the image of the spherical lens and may develop distortion to some extent when it is enlarged. This does not impose any problems in practice.

According to this embodiment as described above, there is provided a two-color head-up display 1 that can be easily fabricated featuring small aberration as a whole and without permitting the display image of at least one color to be distorted even when it is enlarged.

In this embodiment, the first holographic optical element containing the image of the nonspherical lens was exposed first and then the second holographic optical element of the spherical lens was exposed. It is, however, also allowable to expose the second holographic optical element first contrary to the above-mentioned order.

In this embodiment, furthermore, the first holographic optical element and the second holographic optical element were formed in a multiplexed manner on a piece of hologram recording film. It is, however, also allowable to form the first holographic optical element and the second holographic optical element on the separate hologram recording film and, then, stick the two holographic optical elements together.

Moreover, though the nonspherical lens was recorded using a parallel beam and a diverging beam, the combination of beams for recording the desired nonspherical lens is in no way limited to the combination of the parallel beam and the diverging beam.

It is further allowable to fabricate the reflection-type holographic optical element by recording the nonspherical lens through the above-mentioned step, use it as a master holographic optical element, and substituted it for the lens 4025 for obtaining a copy shown in FIG. 55 in order to record the nonspherical lens.

Examples of the photosensitive agent used for the hologram recording film may include a polyvinyl carbazole, a photo polymer, a photoresist agent and the like in addition to a gelatin dichromate.

Figure 56:
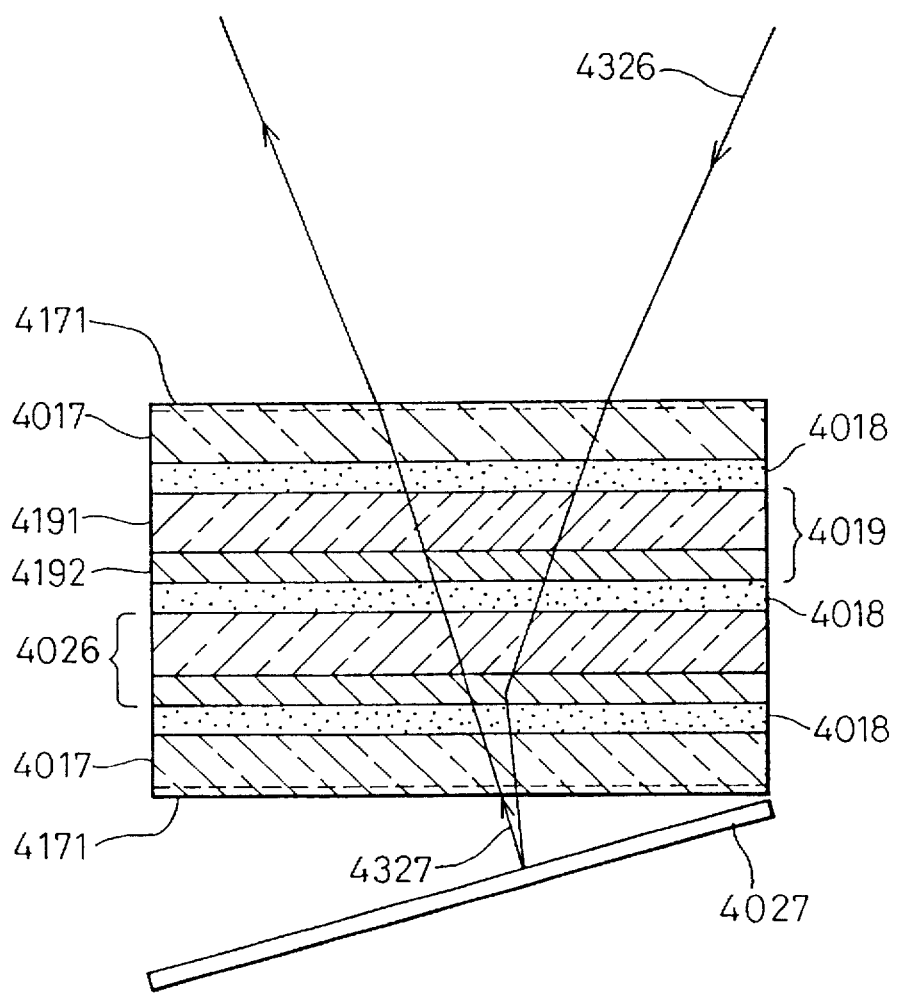
FIG. 56 is a diagram illustrating a step of exposing a holographic optical element to light, the holographic optical element recording a nonspherical lens and being used for the head-up display according to another embodiment.

According to another embodiment which is a modification of the fifth embodiment as shown in FIG. 56, the first holographic optical element recording the nonspherical lens is exposed using a master holographic optical element 4026 of the transmission type. That is, as shown in FIG. 56, the images of hologram recording film 4019 and the transmission-type master holographic optical element 4026 on which predetermined interference fringes are recorded in advance are placed one upon the other, and are held by optical glasses 4017. Then, a predetermined laser beam 4326 is allowed to fall on one side thereof.

The laser beam 4326 partly passes through the hologram recording film 4019 and the master holographic optical element 4026, and the regenerated beam 4327 diffracted by the master holographic optical element 4026 is then reflected by a reflector 4027.

The regenerated beam 4327 that is reflected falls again on the hologram recording film 4019 and forms interference fringes recording the nonspherical lens relative to the laser beam 4326.

In other respects, this embodiment is the same as the fifth embodiment.

Figure 69:
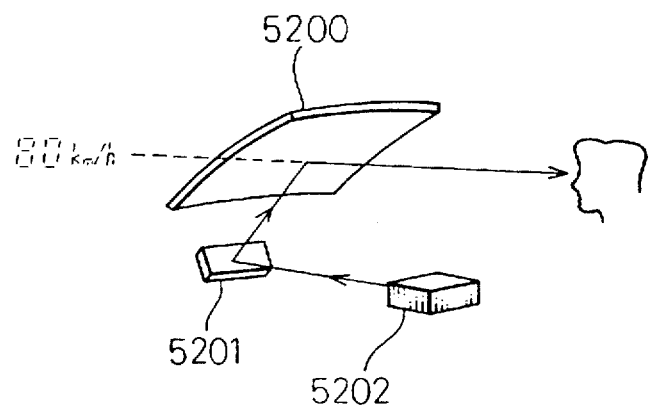
FIG. 69 is a diagram which schematically illustrates a head-up display.

FIG. 69 is a diagram which schematically illustrates the head-up display. The head-up display shown here comprises a windshield combiner 5200, a holographic optical element 5201 that projects the image to be displayed to the windshield combiner 5200, and a display unit 5202 which is made up of, for example, a CRT or the like. According to this head-up display, the beam of any fluorescent emission spectrum from the display unit 5202 is Bragg-reflected by the holographic optical element 5201 to reflect part of the beam of the display unit 5202. The beam is then reflected by the windshield combiner 5200 so as to fall into the eyes of the driver. The holographic optical element 5201 further works to form an image on an enlarged or contracted scale, so that the image, e.g., "80 km/h" displayed by the display unit 5202 is displayed at optional distance.

Described below is a conventional method of producing the holographic optical element 5201.

Figure 70:
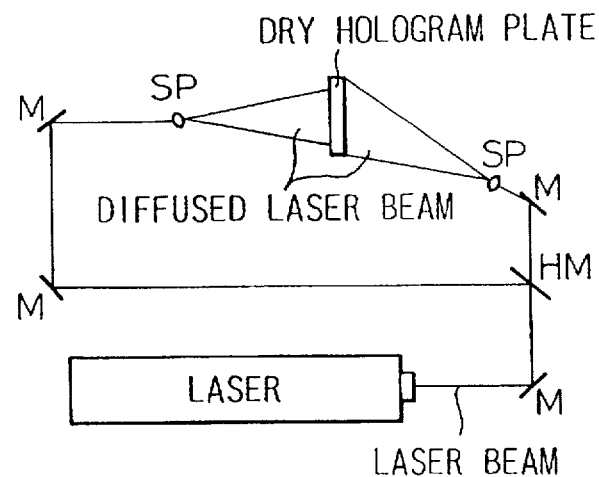
FIG. 70 is a diagram illustrating the two-beam method for producing the holographic optical element using a conventional reflection-type.
Figure 71:
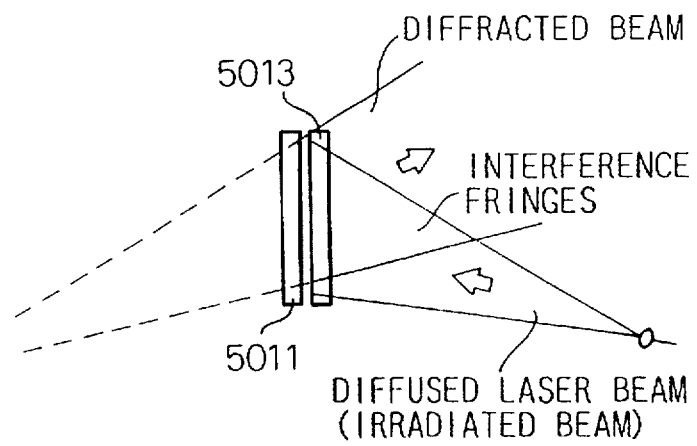
FIG. 71 is a diagram explaining a method of copying a holographic image for producing the holographic optical element using the conventional reflection-type.

FIG. 70 is a diagram explaining the two-beam method for producing an optical element using a conventional reflection-type holographic optical element, and FIG. 71 is a diagram explaining a method of copying a holographic image for producing a holographic optical element using the conventional reflection-type holographic optical element. As shown in FIG. 70, the two-beam method usually uses the reflection-type holographic optical element a laser beam is divided into two so as to fall on the front and back surfaces of the hologram recording film. According to this two-beam method having a long path to the hologram recording film, however, the holographic optical element is subject to be affected by the air fluctuation and vibration. Therefore, a long period of time is needed until they are settled, which is not suited for mass production. To cope with this, there has been proposed a method of copying a holographic image wherein a reflection-type holographic optical element obtained by the two-beam method is used as a master, another hologram recording film is placed in front thereof as shown in FIG. 71, and a laser beam is projected onto the whole surface thereof in order to record interference fringes formed by the laser beam and a diffracted beam that has passed through the hologram recording film and is diffracted by the master.

In fact, however, the reflection-type holographic optical element has very sharp wavelength selectivity and when a laser beam is projected thereto, great irregularity occurs in the distribution of intensities of the diffracted beam due to very small irregularity such as inclination of the diffraction grating that develops when the master holographic optical element is produced. As a result, the irregularity is recorded on the holographic optical element that is copied making it difficult to produce a homogeneous holographic optical element. This problem will be described hereinafter.

Figure 72:
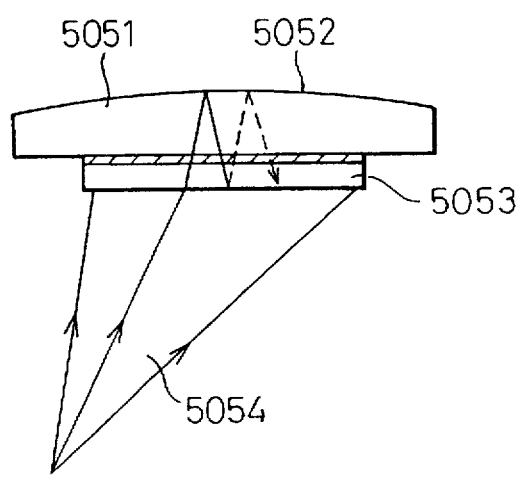
FIG. 72 is a diagram illustrating another conventional method of copying a holographic image.

FIG. 72 is a diagram explaining another method of copying a holographic image which is disclosed in Japanese Unexamined Patent Publication (Kokai) No. 3-273276. According to this method, an optical element 5051 is flat on a first surface and is concave on a second surface and wherein a highly reflecting film 5052 is formed on the concave surface, and a photosensitive plate 5053 for recording the holographic image is superposed on the flat surface. The photosensitive plate 5053 is irradiated with a laser beam 5054 through the front surface thereof, and the beam that is irradiated and a beam reflected by the highly reflecting film 5052 formed on the concave surface interfere with each other to form a holographic optical element copying the concave shape on the photosensitive plate 5053. According to this method of copying the holographic image, the optical characteristics such as focusing characteristics are determined by the concave shape. Therefore, in the case of a simple spherical shape, the concave shape can be easily obtained. When it is attempted to obtain complex optical characteristics to correct aberration, therefore, the concave shape becomes complex and it becomes difficult to obtain the concave shape. In order to solve this problem, there can be contrived a copying method wherein a reflection-type holographic optical element is obtained by the two-beam method, the reflection-type holographic optical element having optical characteristics which are the same as those of a holographic optical element that is to be produced, and is used as a master holographic optical element. Then, a photosensitive plate is superposed thereon and is irradiated with a laser beam through the front surface to copy the holographic image. However, the reflection-type holographic optical element has sharp wavelength selectivity and when a laser beam is projected thereon, deviation in the partly regenerated wavelength caused by irregularity in the diffraction grating turns directly into an irregularity in the intensity of the diffracted beam and is copied onto the photosensitive plate. Therefore, the method that uses the reflection-type holographic optical element as a master has a problem in that irregularities easily occur.

In view of the above-mentioned problems, therefore, the present invention provides a method of producing a reflection-type holographic optical element that is capable of eliminating irregularities.

Figure 59A:
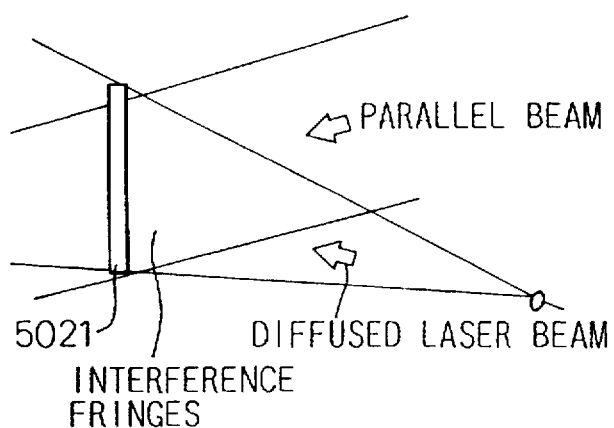
FIGS. 59(a) and 59(b) are diagrams illustrating the constitution for explaining the method of producing the holographic optical element using the reflection-type according to a sixth embodiment of the present invention.
Figure 59B:
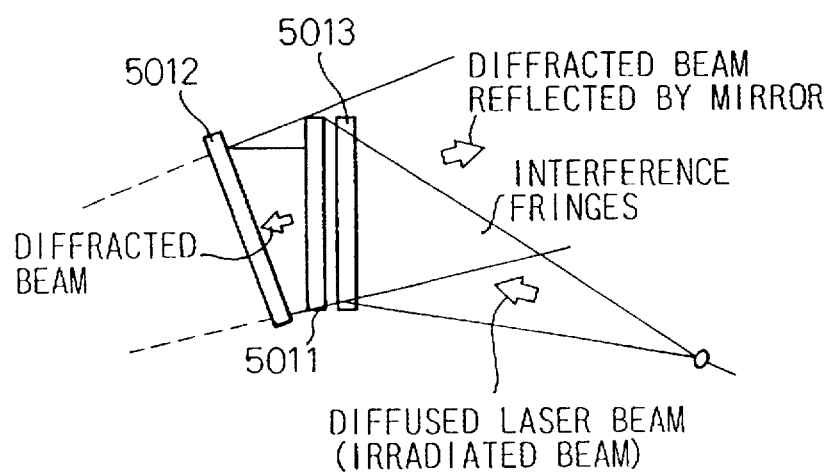

FIGS. 59(a) and 59(b) are diagrams of constitutions illustrating a method of controlling an optical element by using a reflection-type holographic optical element according to a sixth embodiment of the present invention. This embodiment uses, as a master holographic optical element, a transmission-type holographic optical element which has little wavelength selectivity and develops little irregularity in the diffracted beam even when it is irradiated with a laser beam. Referring to FIG. 59(a), the master holographic image is recorded on a hologram recording film 5021 to prepare a transmission-type master holographic optical element 5011. By using this master holographic optical element 5011, the diffracted beam is reflected by a mirror 5012 as shown in FIG. 59(b) to produce a reflection-type holographic optical element. The transmission-type holographic optical element 5011 has little wavelength selectivity and this makes it possible to obtain a uniformly diffracted beam even when it is irradiated with a laser beam. Therefore, there is obtained a uniform reflection-type holographic optical element 5011 utilizing the irradiated beam and the diffracted beam. According to this embodiment as described above, it is made possible to copy a homogeneous reflection-type holographic optical element that is obtained with difficulty when the reflection-type holographic optical element is used as a master. The embodiment will now be described in detail.

Figure 60:
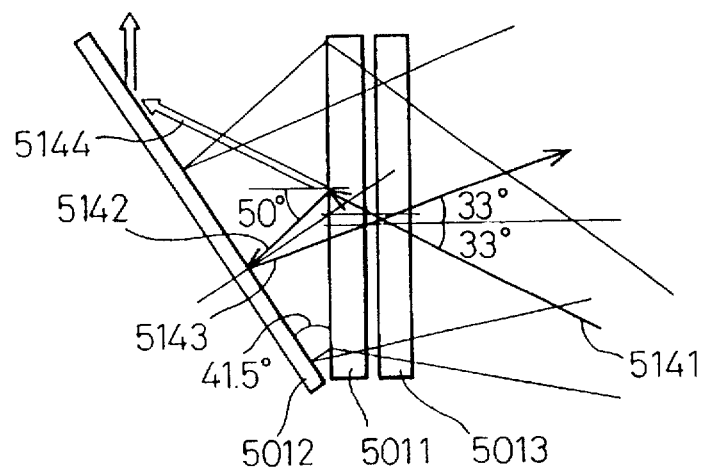
FIG. 60 is a diagram which explains in detail the constitution of FIG. 59(b)

FIG. 60 is a diagram illustrating the constitution of FIG. 59(b) in detail. As shown, the apparatus for copying the holographic image comprises a transmission-type holographic optical element 5011 that serves as a master holographic optical element and a plane mirror 5012 that reflects the diffracted beam. The angle of diffraction of the master holographic optical element 5011 and the angle of disposing the mirror 5012 are determined depending upon the conditions that will be described later. The apparatus for copying the holographic image further comprises a photosensitive plate 5013 that is placed in front of the master holographic optical element 5011 to copy the holographic image. When the master holographic optical element 5011 is irradiated with a laser beam (diffused beam in the drawing) 5141 through the front surface of the photosensitive plate 5013, the laser beam that has passed through the photosensitive plate 5013 is diffracted by the transmission-type holographic optical element 5011, and whereby a diffracted beam 5142 is formed having predetermined optical characteristics. The diffracted beam 5142 is reflected by the plane mirror 5012 to form a reflected beam 5143 which then falls again on the master holographic optical element 5011. Here, however, since the angle of the mirror 5012 has been so set that the angle of incidence is different from the direction of diffraction of the diffracted beam 5142, the holographic optical element 5011 does not interfere with the beam and the laser beam passes through. The reflected beam 5143 falls on the back surface of the photosensitive plate 5013, and interference fringes between the irradiated beam 5141 and the reflected beam 5143 are recorded on the photosensitive plate 5013, thereby forming a reflection-type holographic optical element having optical characteristics as set by the master holographic optical element 5011. Of the beam falling on the master holographic optical element 5011, when a component (zero-order beam) that is not diffracted is reflected by the plane mirror 5012 and falls on the photosensitive base plate 5013 for obtaining copy, the beam could turn into a reflected light resulting in the occurrence of an undesired ghost holographic image. This, however, can be solved by disposing the mirror 5012 at such an angle that the zero-order beam is not allowed to fall upon the photosensitive plate 5013 for obtaining copy. Therefore, the angle of diffraction of the master holographic optical element 5011 of the mirror 5012 and the angle of disposing the plane mirror 5012 are so set as to satisfy the following three requirements.

(1) The diffracted beam 5143 reflected by the mirror 5012 is incident upon the photosensitive plate 5013 for obtaining copy (angle required for the reflection-type holographic optical element that is copied).

(2) The diffracted beam 5143 reflected by the mirror 5012 is not diffracted by the master holographic optical element 5011 when it falls again on the master holographic optical element 5011.

(3) The zero-dimensional beam reflected by the mirror 5012 does not fall on the photosensitive plate 5013.

Mentioned below are concrete examples of angles described in FIGS. 59(a) and 59(b). In the master holographic optical element 5011 are recorded interference fringes for diffracting, to a direction of 50°, a laser beam incident in a direction of 33° with respect to a perpendicular to the surface of the master holographic optical element 5011, and the plane mirror 5012 is disposed at the back of the master holographic optical element 5011 being tilted by 41.5° with respect to the surface of the master holographic optical element. The laser beam that is incident on the master holographic optical element 5011 from a direction of 33° with respect to a perpendicular thereof, is diffracted to a direction of 50°. The diffracted beam is reflected by the plane mirror 5012 and falls on the back surface of the master holographic optical element 5011 from a direction of 33° with respect to the perpendicular thereof. Here, since this angle is away from the angle of diffraction of 50°, the beam is not diffracted again but passes through the master holographic optical element 5011. As a result, the photosensitive plate 5013 placed in front of the master holographic optical element 5011 in parallel therewith is irradiated with laser beams through front and back surfaces thereof from directions that are tilted by 330 with respect to the perpendiculars thereof, and interference fringes thereof are recorded to copy the holographic optical element.

Figure 61:
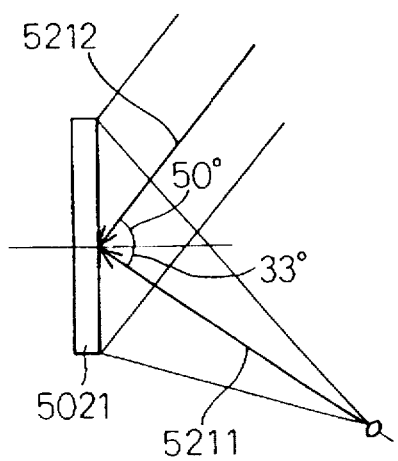
FIG. 61 is a diagram which explains in detail the optical system for producing a master holographic optical element 5011 of FIG. 59(a)

FIG. 61 is a diagram which illustrates in detail an optical system for producing the master holographic optical element 5011 of FIG. 59(a). As shown, a diverging beam 5211 and a parallel beam 5212 fall at predetermined angles on the front surface of the photosensitive plate 5021, whereby the image of the master holographic optical element 5011 is recorded.

Figure 62:
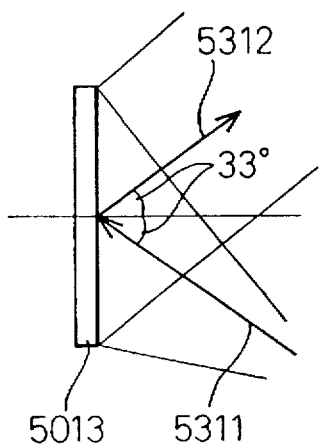
FIG. 62 is a diagram explaining the use of a copy holographic optical element 5013.

FIG. 62 is a diagram explaining how to use a copy holographic optical element. The photosensitive plate 5013 for obtaining copy shown in FIGS. 59(a) and 59(b) becomes a copy holographic optical element. When the diverging beam 5311 arrives from a direction of 33°, the parallel beam is diffracted to a direction of 33°. In this embodiment, the master holographic image is recorded using the diverging beam and the parallel beam and, hence, the copy holographic optical element possesses the optical characteristics of a parabolic reflector.

According to another modification of this embodiment, the optical characteristics of the master holographic optical element are not limited to those that are described above but may be those of an oval reflector by permitting diverging beams to interfere with each other. A mirror for reflecting the diffracted beam is not limited to the plane mirror only. For instance, it may be a concave reflector that forms a beam for recording the copy holographic image having predetermined optical characteristics in combination with the master holographic optical element. Described below is an improvement of the above-mentioned embodiment.

Figure 63:
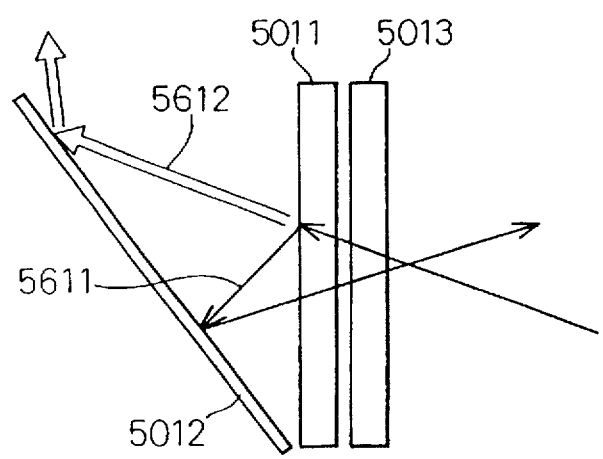
FIG. 63 is a diagram explaining points to be improved in the sixth embodiment.

FIG. 63 is a diagram illustrating points to be improved in the sixth embodiment. According to the aforementioned embodiment as shown, the transmission-type holographic optical element is used as the master in order to copy the master holographic image having complex optical characteristics such as a nonspherical shape without developing irregularities by utilizing the low wavelength selectivity of the transmission-type holographic optical element. The master holographic optical element 5011, irradiated with a laser beam, produces a diffracted beam 5611 which is reflected by the mirror 5012, and falls on the photosensitive plate 5013 placed in front of the master holographic optical element 5011 whereby interference fringes relative to the irradiated laser beam are recorded and a reflection-type holographic optical element is formed. The mirror 5012 is obliquely arranged with respect to the photosensitive plate 5013, so that the beam (zero-order beam) 5612 that has passed through the master holographic optical element is not reflected by the mirror 5012 to fall on the photosensitive plate 5013. According to the above-mentioned copying method in which the transmission-type holographic optical element is used as the master holographic optical element, a space is formed between the photosensitive base plate 5013 for obtaining copy and the mirror 5012 since the mirror 5012 is arranged obliquely. In the arrangement of FIG. 63, therefore, there exists an interface relative to the air on the back surface of the master holographic optical element 5011, whereby the beam is reflected by the back surface and the reflected beam falls on the photosensitive base plate 5013 for obtaining copy so as to produce a reflected light. Moreover, the air fluctuation in the space deteriorates the quality of the copy holographic optical element. To cope with this, a method can be contrived to eliminate the air layer by providing a prism having a triangular shape in cross section in the space. In this case, however, aberration occurs due to the prism and the displayed image is distorted when it is used for the head-up display. It therefore becomes necessary to prevent the occurrence of the reflected light while suppressing aberration by using a prism even when producing the master holographic optical element to establish an optical system in which the above prism offsets the aberration of the prism that is used at the time of obtaining a copy.

Figure 64A:
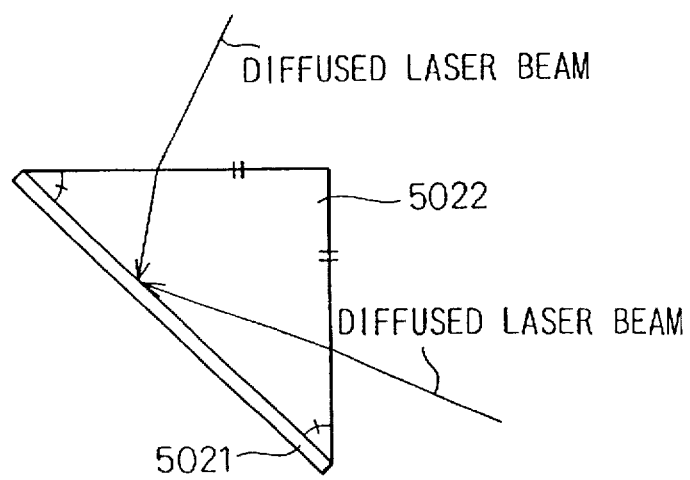
FIGS. 64(a) and 64(b) are diagrams of the constitution for explaining the method of producing the holographic optical element using the reflection-type according to another embodiment of the present invention.
Figure 64B:
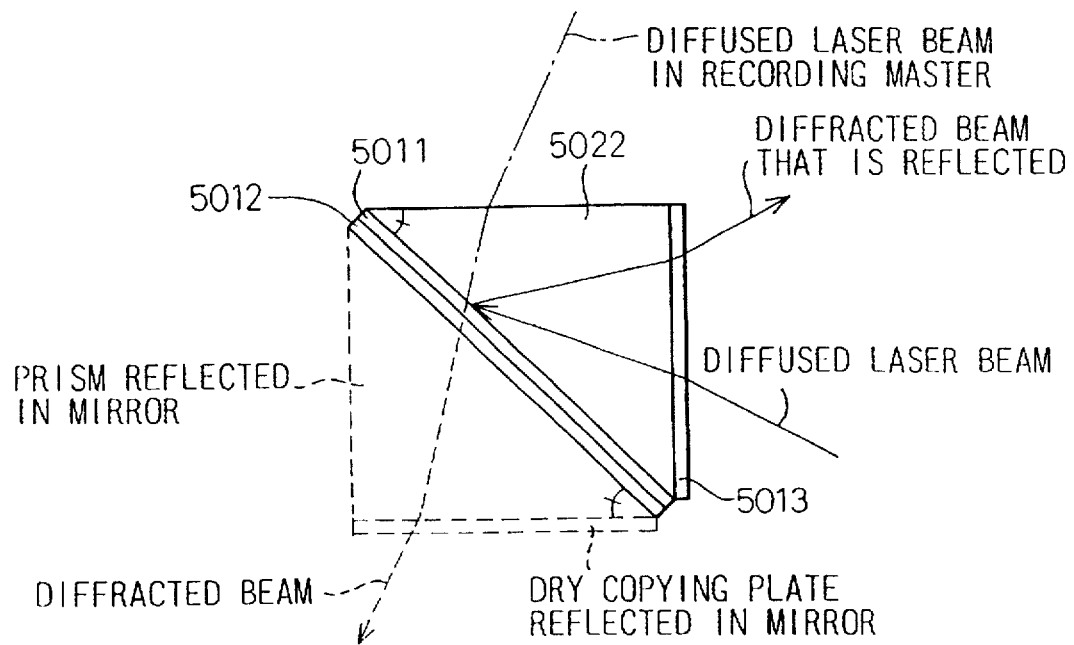

FIGS. 64(a) and 64(b) are diagrams of constitutions for explaining a method of producing a holographic optical element by using the reflection-type according to another embodiment of the present invention. In order to solve the above-mentioned problem according to this embodiment as shown in FIG. 64(a), use is made of a prism 5022 having an isosceles triangular shape in cross section in order to cancel the reflection by the back surface without developing aberration, a hologram recording film 5021 is set to the surface that corresponds to the base, and diffused laser beams are permitted to fall on the two equal sides to produce the transmission-type master holographic optical element 5011. To copy the holographic optical element as shown in FIG. 64(b), the mirror 5012 is fitted to the back surface of the master holographic optical element 5011, the hologram recording film 5013 is fitted to one of the two equal sides and, then, a diffused laser beam is permitted to fall thereby to constitute a holographic optical element relative to the beam diffracted by the master holographic optical element and reflected by the mirror 5012. Here, if the path of the diffracted beam is followed, the plane of the prism on which the beam is incident at the time of recording the master and the plane of the prism from which the beam goes out at the time of copying are parallel to each other with the mirror 5012 being sandwiched therebetween. Therefore, the diffracted beam simply undergoes parallel translation and almost no aberration is produced by the prism. This will be described in detail hereinbelow.

Figure 65:
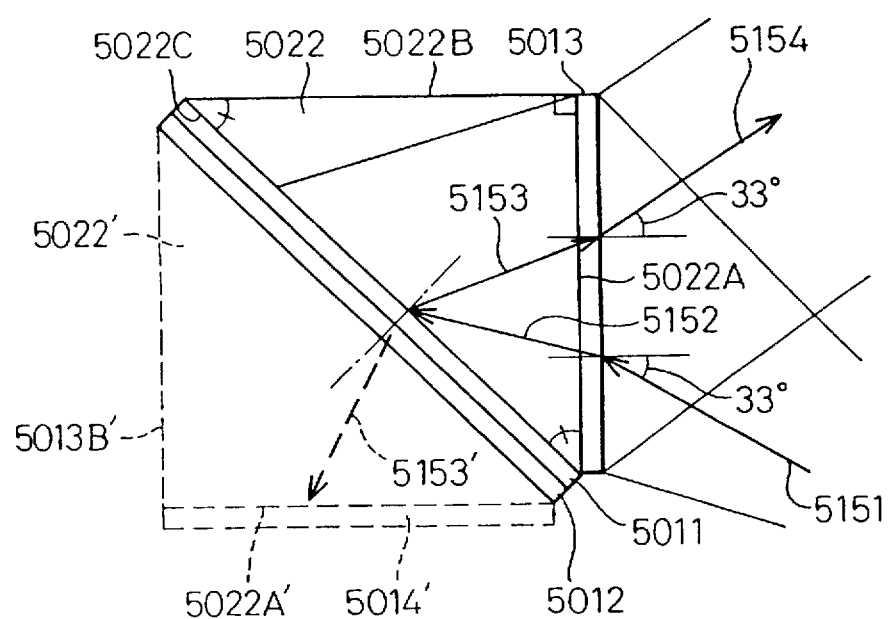
FIG. 65 is a diagram explaining in detail the constitution of FIG. 64(b)
Figure 66:
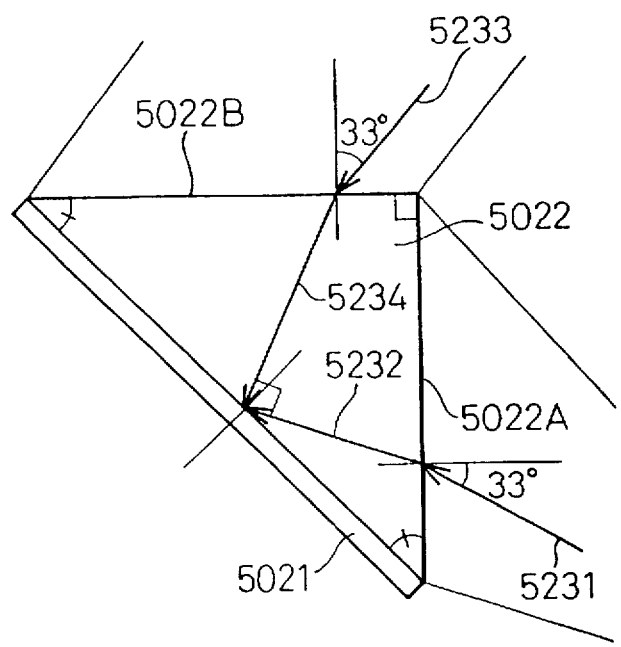
FIG. 66 is a diagram illustrating in detail the optical system for producing the master holographic optical element 5011 of FIG. 64(a)

FIG. 65 is a diagram which illustrates in detail the constitution of FIG. 64(b) and FIG. 66 is a diagram illustrating an optical system for producing the master holographic optical element 5011 of FIG. 64(a). The device for copying the holographic optical element shown in FIG. 65 comprises a prism 5022 having an isosceles triangular shape in cross section (right-angled isosceles triangle in the drawing), a master holographic optical element 5011 and a plane mirror 5012, and a photosensitive plate 5013 for obtaining copy is mounted on one of the equal sides of the prism 22. In FIG. 66, a photosensitive base plate 5021 that serves as the master holographic optical element 5011 is stuck to the surface 5022C that corresponds to the base of the prism 5022 of the shape as the one shown in FIG. 65. Described below are concrete examples of angles shown in FIGS. 65 and 66.

In FIG. 66, laser beams are incident on the two equal sides of the prism 5022 from directions that are tilted by 33° with respect to the perpendiculars thereof. In this embodiment, a diverging beam 5231 falls on the prism surface 5022A and a diverging beam 5232 falls on the prism surface 5022B, the optical axes of the two beams being at right angles with each other. The laser beams passing through the prism 5022 undergo interference, and interference fringes are recorded on the photosensitive plate 5021 to form the master holographic optical element 5011. Then, referring to FIG. 65, a plane mirror is attached to the bottom surface 5022C of the prism 5022 having the same shape as that of the prism 5022, and a laser beam 5151 same as the diverging beam 5231 at the time of recording the master holographic image is permitted to fall on the front surface of the photosensitive plate 5013 mounted on one side 5022A of the two equal sides of the prism 5022. The laser beam 5151 is then diffracted by the master holographic optical element 5011 to produce a diffracted beam 5153'. The diffracted beam 5153' is reflected by the plane mirror 5012 to form a reflected beam 5153 which then passes again through one side 5022A of the prism 5022 to fall on the photosensitive plate 5013, whereby a reflection-type holographic image is recorded on the photosensitive plate 5013 due to the interference between the incident beam 5151 and the reflected beam 5153. Attention is now given to an image 5022' of the prism 5022 reflected in the plane mirror 5012, the diffracted beam 5153' travelling therethrough and going out from one side 5022A' of the prism 5022'. The side 5022B which is the surface equal to the surface 5022B on which the parallel beam 5232 is incident at the time of recording the master holographic image is parallel to the side 5022A' (since the same angle is subtended by 5022A and 5022B with respect to 5022C). Therefore, the reflected beam 5154 apparently passes through two parallel surfaces 5022A and 5022B. Therefore, the beam is incident on the photosensitive plate 5013 without almost developing aberration by the prism 5022, and the image is not distorted in the completed copy holographic optical element.

According to this embodiment as described above, the presence of the prism 5022 between the photosensitive base plate 5013 for obtaining copy and the plane mirror 5012 eliminates adverse effects caused by a reflected light reflected by the interface and the air fluctuation. Besides, the prism 5022 hardly develops any aberration, making it possible to form a high quality reflection-type holographic optical element.

Figure 67:
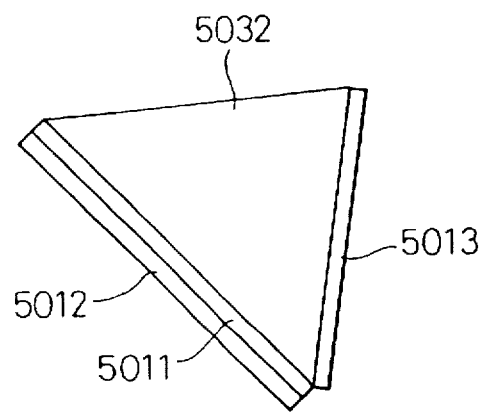
FIG. 67 is a diagram illustrating a first modification of FIG. 65.
Figure 68:
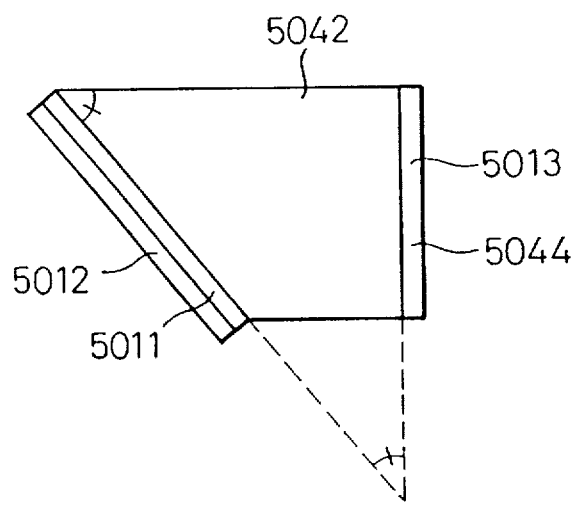
FIG. 68 is a diagram illustrating a second modification of FIG. 65.

FIGS. 67 to 68 are diagrams illustrating first and second modifications of FIG. 65. The sectional shape of the prism is not limited to the right-angles isosceles triangular shape shown in the embodiment. The angles subtended by the surfaces on which the two master hologram-recording beams are incident relative to the mirror should be the same. Therefore, the shapes shown in these drawings may be employed, wherein reference numerals 5032 and 5042 denote prisms.

According to the present invention which employs a transmission-type holographic optical element which has little wavelength selectivity and produces little irregularity in the diffracted beam even upon irradiated with a laser beam as described above, the diffracted beam is reflected by a mirror, and interference fringes with the irradiated beam are recorded on the photosensitive plate for, in order to copy a reflection-type holographic image having little irregularity in the diffraction efficiency and maintaining optical characteristics that are set at the time of forming the transmission-type holographic optical element. At the time of producing the master holographic optical element, furthermore, the air fluctuation is eliminated by using the prism and an optical system is established in which the prism eliminates aberration of a prism that is used for obtaining a copy. Thus, reflected light is not produced and aberration is not generated, either.

We claim:

1. A method of producing a holographic optical element by copying a master holographic image, comprising steps of:

providing a prism having a base surface and a first surface, a first hologram recording film, and a second hologram recording film, said prism being made of a transparent material having a first refractive index which is nearly equal to a second refractive index of said first hologram recording film;

adhering intimately said prism to a front surface of said first hologram recording film for recording said master holographic image;

projecting said master holographic image to said first hologram recording film by permitting a recording beam to fall on said base surface of said prism and on a back surface of said first hologram recording film;

recording said master holographic image in said first hologram recording film to thereby form said master holographic optical element;

adhering intimately said formed master holographic optical element to said first surface of said prism and said second hologram recording film to said base surface of said prism for copying said master holographic image; and copying said master holographic image by permitting a copying beam to fall on said second hologram recording film, thereby forming a copy holographic optical element;

said prism having a vertical angle so that said copy holographic optical element is tilted with respect to said master holographic optical element to prevent reflected light between said prism and said master holographic optical element from falling on said copy holographic optical element while allowing a diffracted beam from said master holographic optical element to fall on said copy holographic optical element.

2. A method of producing a holographic optical element according to claim 1, wherein said prism comprises a transparent solid material selected from a group consisting of glass and resin.

3. A method of producing a holographic element by copying a master holographic image, comprising steps of:

providing a prism having a base surface and a first surface, a first hologram recording film, and a second hologram recording film, said prism being made of a transparent material having a first reflective index which is nearly equal to a second refractive index of said first hologram recording film;

adhering intimately said prism to a front surface of said first hologram recording film for recording said master holographic image;

projecting said master holographic image to said first hologram recording film by permitting a recording beam to fall on said base surface of said prism and on a back surface of said first hologram recording film;

recording said master holographic image in said first hologram recording film to thereby form said master holographic optical element;

adhering intimately said formed master holographic optical element to said first surface of said prism and said second hologram recording film to said base surface of said prism for copying said master holographic image: and copying said master holographic image by permitting a copying beam to fall on said second hologram recording film, thereby forming a copy holographic optical element:

wherein said prism has a vertical angle such that a first direction of a diffracted beam from said master holographic optical element and a second direction of reflected light are deviated from each other by a predetermined amount even if said vertical angle is small enough that light reflected due to an interface between said master holographic optical element and said prism is incident upon said second hologram recording film for copying said master holographic image.

4. A method of producing a holographic optical element by copying a master holographic image, comprising steps of:

providing a first prism having a base surface and a first surface, a second prism having a base surface, a first hologram recording film, and a second hologram recording film, said first prism and said second prism each being made of a transparent material having a first refractive index which is nearly equal to a second refractive index of said hologram recording film;

adhering intimately said first prism to a front surface of a hologram recording film for recording said master holographic image;

disposing said second prism on a back surface of said hologram recording film in a manner opposite to said first prism for recording said master holographic image;

forming said master holographic optical element by permitting a recording beam to fall on said base surfaces of said first prism and said second prism;

adhering intimately said formed master holographic optical element to said first surface of said first prism and said second hologram recording film for copying said holographic image to said base surface of said first prism; and copying said master holographic image by permitting a copying beam to fall on said second hologram recording film, thereby forming a copy holographic optical element;

said first prism having a vertical angle such that said copy holographic optical element is tilted with respect to said master holographic optical element to prevent reflected light between said first prism and said master holographic optical element from falling on said copy holographic optical element while allowing a diffracted beam from said master holographic optical element to fall on said copy holographic optical element.

5. A method of producing a holographic optical element according to claim 4, wherein said first prism and said second prism comprise a transparent solid material selected from a group consisting of glass and resin.

6. A method of producing a holographic optical element by copying a master holographic image, comprising steps of:

providing a first prism having a base surface and a first surface, a second prism having a base surface, a first hologram recording film, and a second hologram recording film, said first prism and said second prism each being made of a transparent material having a first refractive index which is nearly equal to a second refractive index of said hologram recording film;

adhering intimately said first prism to a front surface of a hologram recording film for recording said master holographic image;

disposing said second prism on a back surface of said hologram recording film in a manner opposite to said first prism for recording said master holographic image;

forming said master holographic optical element by permitting a recording beam to fall on said base surfaces of said first prism and said second prism:

adhering intimately said formed master holographic optical element to said first surface of said first prism and said second hologram recording film for copying said holographic image to said base surface of said first prism; and copying said master holographic image by permitting a copying beam to fall on said second hologram recording films thereby forming a copy holographic optical element:

wherein respective vertical angles of said first prism and said second prism are such that a first direction of a diffracted beam from said master holographic optical element and a second direction of reflected light are deviated from each other by a predetermined amount even if said vertical angle of said first prism is so small that light reflected due to an interface between said master holographic optical element and said first prism is incident upon said second hologram recording film for copying said master holographic image.

7. A method of producing a holographic optical element by copying a master holographic image, comprising steps of:

providing a transmission-type master holographic optical element, a hologram recording film, and a mirror;

disposing said mirror facing a back surface of said master holographic optical element;

irradiating a beam through said master holographic optical element and through said hologram recording film for obtaining a copy;

reflecting said irradiated beam emerging from a back surface of said hologram recording film using said mirror, said reflected beam being a diffracted beam based on a holographic image encoded in said master holographic optical element;

interfering said reflected beam with said irradiated beam to form interference fringes;

recording a copy of said holographic image encoded in said master holographic optical element in said hologram recording film; and setting an angle of diffraction of said master holographic optical element and an angle of inclination of said mirror such that a zero-order beam component that is not diffracted by said master holographic optical element will not be superimposed on said reflected beam reflected by said mirror.

8. A method of producing a holographic optical element according to claim 7, further comprising a step of:

tilting said mirror with respect to said hologram recording film.

9. A method of producing a holographic optical element according to claim 8, further comprising steps of:

providing a prism between said hologram recording film and said mirror; and adhering intimately one side of said prism to said hologram recording film.

10. A method of producing a holographic optical element according to claim 8, further comprising steps of:

providing a prism between said hologram recording film and said master holographic optical element; and adhering intimately one side of said prism to said hologram recording film.

11. A method of producing a holographic optical element according to claim 7, further comprising steps of:

providing a prism between said hologram recording film and said mirror; and adhering intimately one side of said prism to said hologram recording film.

12. A method of producing a holographic optical element according to claim 7, wherein:

said irradiated beam is placed at an angle with respect to said master holographic optical element which prevents a zero-order component of a regenerated light source from reflecting to said copy holographic optical element.

13. A method of producing a holographic optical element according to claim 7, further comprising a step of:

tilting said master holographic optical element with respect to said hologram recording film.

14. A method of producing a holographic optical element according to claim 13, further comprising:
providing a prism between said hologram recording film and said mirror; and
adhering intimately one side of said prism to said hologram recording film.

15. A method of producing a holographic optical element according to claim 13, wherein:
providing a prism between said hologram recording film and said master holographic optical element; and
adhering intimately one side of said prism to said hologram recording film.

16. A method of producing a holographic optical element according to claim 7, further comprising a step of:
forming said master holographic optical element using a transmission-type holographic optical element.

17. A method of producing a holographic optical element according to claim 7, further comprising a step of:
forming said master holographic optical element using a reflection-type holographic optical element.

18. A method of producing a holographic optical element according to claim 17, further comprising steps of:
providing a prism between said hologram recording film and said master holographic optical element; and
adhering intimately one side of said prism to said hologram recording film.

19. A method of producing a holographic optical element by copying a master holographic image, comprising steps of:
providing a transmission-type master holographic optical element, a hologram recording film, and a mirror;
disposing said mirror facing a back surface of said master holographic optical element;
irradiating a beam through said master holographic optical element and through said hologram recording film for obtaining a copy;
reflecting said irradiated beam emerging from a back surface of said hologram recording film using said mirror, said reflected beam being a diffracted beam based on a holographic image encoded in said master holographic optical element;
interfering said reflected beam with said irradiated beam to form interference fringes;
recording a copy of said holographic image encoded in said master holographic optical element in said hologram recording film; and
inclining said mirror to an angle such that a zero-order beam component that is not diffracted by said master holographic optical element will not fall on said hologram recording film for obtaining said copy.

20. A method of producing a holographic optical element according to claim 19, further comprising steps of:
providing a prism between said hologram recording film and said mirror; and
adhering intimately one side of said prism to said hologram recording film.

21. A method of producing a holographic optical element according to claim 19, further comprising steps of:
providing a prism between said hologram recording film and said master holographic optical element; and
adhering intimately one side of said prism to said hologram recording film.

22. A method of producing a holographic optical element by copying a master holographic image, comprising steps of:
providing a transmission-type master holographic optical element, a hologram recording film, and a mirror;
disposing said mirror facing a back surface of said master holographic optical element;
irradiating a beam through said master holographic optical element and through said hologram recording film for obtaining a copy;
reflecting said irradiated beam emerging from a back surface of said hologram recording film using said mirror, said reflected beam being a diffracted beam based on a holographic image encoded in said master holographic optical element;
interfering said reflected beam with said irradiated beam to form interference fringes;
recording a copy of said holographic image encoded in said master holographic optical element in said hologram recording film; and
inclining said master holographic optical element such that a zero-order beam component that is not diffracted by said master holographic optical element will not fall on said hologram recording film when reflected by said back surface of said master holographic optical element and when reflected by an interface between said hologram recording film and said master holographic optical element.

23. A method of producing a holographic optical element according to claim 22, further comprising steps of:
providing a prism between said hologram recording film and said mirror; and
adhering intimately one side of said prism to said hologram recording film.

24. A method of producing a holographic optical element according to claim 22, further comprising steps of:
providing a prism between said hologram recording film and said master holographic optical element; and
adhering intimately one side of said prism to said hologram recording film.

25. A method of producing a holographic optical element by copying a master holographic image, comprising steps of:
providing a transmission-type master holographic optical element, a hologram recording film, and a mirror;
disposing said mirror facing a back surface of said master holographic optical element;
irradiating a beam through said master holographic optical element and through said hologram recording film for obtaining a copy;
reflecting said irradiated beam emerging from a back surface of said hologram recording film using said mirror, said reflected beam being a diffracted beam based on a holographic image encoded in said master holographic optical element;
interfering said reflected beam with said irradiated beam to form interference fringes;
recording a copy of said holographic image encoded in said master holographic optical element in said hologram recording film; and
inclining said master holographic optical element at an angle such that a zero-order beam component that is not diffracted by said master holographic optical element but that is reflected by at least one of said back surface of said master holographic optical element and an interface between said hologram recording film and said master holographic optical element, will not overlap a beam diffracted by said master holographic optical element.

26. A method of producing a holographic optical element according to claim 25, further comprising steps of:
providing a prism between said hologram recording film and said mirror; and
adhering intimately a first side of said prism to said hologram recording film.

27. A method of producing a holographic optic element according to claim 26, further comprising a step of:
adhering intimately a second side of said prism to said mirror.

28. A method of producing a holographic optical element according to claim 25 wherein:
said irradiated beam is placed at an angle with respect to said master holographic optical element which prevents a zero-order component of a regenerated light source from reflecting from said copy holographic optical element.

29. A method of producing a holographic optical element according to claim 28, further comprising a step of:
forming said master holographic optical element using a transmission-type holographic optical element.

30. A method of producing a holographic optical element according to claim 28, further comprising a step of:
forming said master holographic optical element using a reflection-type holographic optical element.

31. A method of producing a holographic optical element according to claim 25, further comprising steps of:
providing a prism between said hologram recording film and said master holographic optical element; and
adhering intimately a first side of said prism to said hologram recording film.

32. A method of producing a holographic optical element according to claim 31, further comprising the step of:
adhering intimately a second side of said prism to said master holographic optical element.

33. A method of producing a holographic optical element by copying a master holographic image, comprising steps of:
forming a master holographic optical element using a prism by placing a photosensitive plate on one side of said prism and projecting two beams onto two surfaces of said prism at equal angles with respect to these two surfaces;
placing said master holographic optical element on the same one side of said prism on which said photosensitive plate was placed;
placing a mirror on a back surface of said master holographic optical element in order to reflect a beam diffracted by said master holographic optical element; and
placing a hologram recording film on one surface of said prism subtending a same angle as said equal angles in order to copy interference fringes encoded in said master holographic optical element.

34. A method of producing a holographic optical element according to claim 32, further comprising a step of:
forming said master holographic optical element using a transmission-type holographic optical element.

35. A method of producing a holographic optical element according to claim 33, further comprising a step of:
forming said master holographic optical element using a reflection-type holographic optical element.

36. A method of producing a holographic optical element by copying a master holographic image, comprising steps of:
providing a prism of isosceles triangular shape including a right-angle, said prism having a base and two equal sides;
placing a photosensitive base plate on one of said two equal sides of said prism;
reflecting an irradiated beam incident upon said base of said prism from the other of said two equal sides of said prism and causing said reflected beam to fall on said photosensitive plate;
placing a mirror opposite said one of said two equal sides of said prism at an angle corresponding to an angle of said prism;
recording interference fringes formed by an interference of said reflected beam with said irradiated beam on said photosensitive base plate; and
copying said master holographic image as recorded on said photosensitive base plate on a hologram recording film to form a copy holographic optical element.

37. A device for producing a holographic optical element comprising:
a transmission-type master holographic optical element;
a mirror provided on a back surface of said master holographic optical element to reflect a beam diffracted by said master holographic optical element; and
a hologram recording film placed on a front surface of said master holographic optical element;
interference fringes being formed on said hologram recording film by an interference between said diffracted beam falling on said back surface of said master holographic optical element with an irradiated beam passing through said hologram recording film and emerging from a back surface of said hologram recording film and said irradiated beam;
said irradiated beam being transmitted through said transmission-type master holographic optical element and being reflected by said mirror; and
said reflected beam being said diffracted beam based on a holographic image encoded in said master holographic optical element; and
an angle of diffraction of said master holographic optical element and an angle of inclination of said mirror being such that a zero-order beam component that is not diffracted by said master holographic optical element will not be superimposed on said reflected beam reflected by said mirror.

38. A device for producing a copy of a master holographic optical element, wherein a master holographic optical element is formed by using a prism and by placing a photosensitive base plate on one side of said prism and by causing beams to fall on two surfaces of said prism at same respective angles with respect to said two surfaces, said device comprising:
said master holographic optical element placed on the same one side of said prism on which said photosensitive plate was placed;
a mirror placed on a back surface of said master holographic optical element to reflect a beam diffracted by said master holographic optical element; and
a hologram recording film placed on one surface of said prism subtending a same angle as said respective angles in order to copy a master holographic image encoded in said master holographic optical element in a form of interference fringes formed by an interference between a beam incident on a front surface and said beam diffracted by said master holographic optical element after reflection by said mirror.

39. A device for producing a holographic optical element by copying a master holographic optical element using a reflected/diffracted beam, comprising:

a first prism and a second prism each of isoceles triangular shape including a right-angle, each of said first prism and said second prism having a base and two equal sides;

a master holographic optical element formed by reflecting a beam incident on said base of said first prism from one of said two equal sides of said first prism and permitting it to fall on a photosensitive base plate;

a mirror which reflects an irradiated beam diffracted by said master holographic optical element, said mirror being placed on one of said two equal sides of said second prism; and a hologram recording film placed on the other of said two equal sides of said second prism, said diffracted beam interfering with said irradiated beam to form interference fringes on said hologram recording film.

* * * * *